United States Patent
Gushima et al.

(10) Patent No.: US 7,940,614 B2
(45) Date of Patent: May 10, 2011

(54) METHOD AND AN APPARATUS FOR RECORDING INFORMATION, AND AN INFORMATION RECORDING MEDIUM

(75) Inventors: Toyoji Gushima, Habikino (JP); Motoshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 330 days.

(21) Appl. No.: 12/196,583

(22) Filed: Aug. 22, 2008

(65) Prior Publication Data

US 2009/0010124 A1     Jan. 8, 2009

Related U.S. Application Data

(62) Division of application No. 10/849,179, filed on May 20, 2004, now Pat. No. 7,453,781.

(30) Foreign Application Priority Data

May 20, 2003   (JP) ................................ 2003-141716

(51) Int. Cl.
*G11B 7/00* (2006.01)
(52) U.S. Cl. .................. 369/47.27; 369/275.3
(58) Field of Classification Search .............. 369/47.1, 369/275.3, 47.27, 47.22, 53.15, 53.17, 53.24, 369/94, 275.4, 53.2, 53.22
See application file for complete search history.

(56) References Cited

U.S. PATENT DOCUMENTS

| | | | |
|---|---|---|---|
| 5,818,807 A | 10/1998 | Kuroda et al. | |
| 6,367,038 B1 | 4/2002 | Ko | |
| 6,542,450 B1 | 4/2003 | Park | |
| 6,747,929 B1 | 6/2004 | Ko et al. | |
| 7,002,882 B2 * | 2/2006 | Takahashi | 369/47.14 |
| 7,050,369 B2 | 5/2006 | Lee et al. | |
| 7,193,959 B2 | 3/2007 | Lee et al. | |
| 2001/0036136 A1 | 11/2001 | Fukushima et al. | |
| 2003/0063535 A1 | 4/2003 | Shoji et al. | |
| 2003/0185121 A1 | 10/2003 | Narumi et al. | |

FOREIGN PATENT DOCUMENTS

| | | |
|---|---|---|
| CN | 1112273 | 11/1995 |
| EP | 0653758 | 5/1995 |
| JP | 63-146287 | 6/1988 |
| JP | 6-338139 | 12/1994 |

(Continued)

OTHER PUBLICATIONS

Chinese Office Action issued Nov. 23, 2007 in the foreign Chinese application No. 2004-10045824.7 (with English translation document).

*Primary Examiner* — Nabil Z Hindi
(74) *Attorney, Agent, or Firm* — Wenderoth, Lind & Ponack, L.L.P.

(57) ABSTRACT

In a method for recording information on an information recording medium having a data recording area for storing user data and a test area used for test recording by a recording apparatus, it is detected whether the test area is unusable when executing the test recording. The test recording is executed in the test area when the test area is detected not to be unusable, or executed in the data recording area when detected to be unusable. Management information relating to the test recording executed in the data recording area is recorded in a predetermined area. Hence, it is possible to eliminate a limit of number of times of test recording which depends on the size of the test recording area.

6 Claims, 12 Drawing Sheets

FOREIGN PATENT DOCUMENTS

| | | |
|---|---|---|
| JP | 7-141660 | 6/1995 |
| JP | 7182218 | 7/1995 |
| JP | 7-311942 | 11/1995 |
| JP | 8-203081 | 8/1996 |
| JP | 9-63061 | 3/1997 |
| JP | 10-255266 | 9/1998 |
| JP | 2000-113598 | 4/2000 |
| JP | 2000-149449 | 5/2000 |
| JP | 3099009 | 8/2000 |
| JP | 2000-276838 | 10/2000 |
| JP | 2000-285607 | 10/2000 |
| JP | 2000-339869 | 12/2000 |
| JP | 2 001-331945 | 11/2001 |
| JP | 3285338 | 3/2002 |
| JP | 2002-175624 | 6/2002 |
| JP | 2002-358648 | 12/2002 |
| JP | 2003-91820 | 3/2003 |
| WO | 02/23542 | 3/2002 |

* cited by examiner

Fig.7

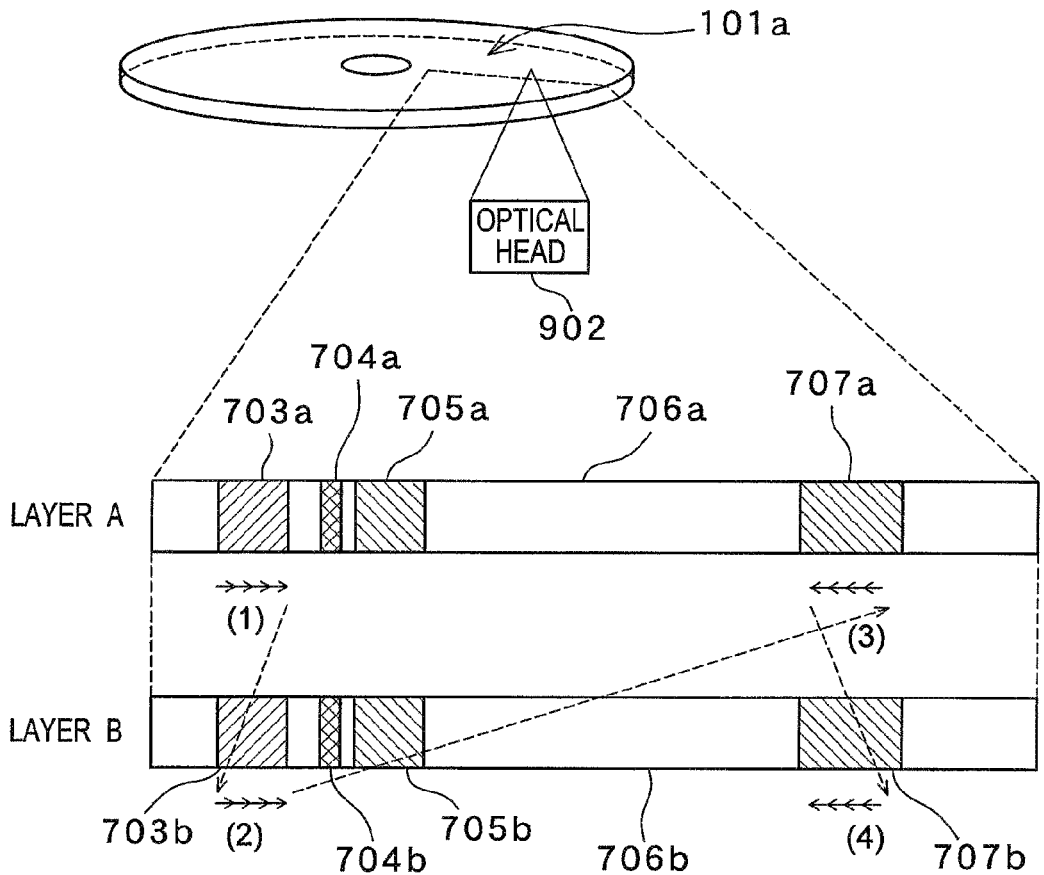

Fig.8

| TYPE INFORMATION IDENTIFIER | PHYSICAL ADDRESS OF DEFECT RECORDING BLOCK | PHYSICAL ADDRESS OF REPLACEMENT RECORDING BLOCK |
|---|---|---|
| NORMAL (REPLACED) "0000" | PBAm1@ DATA RECORDING AREA | PBAn1@ SPARE AREA |
| NORMAL (NOT REPLACED) "0001" | PBAm2@ DATA RECORDING AREA | — |
| OPC "0010" | PBAm3@ TEST RECORDING AREA | — |
| OPC2 "0011" | PBAm4@ SPARE AREA | — |
| DriveInformation "0100" | — | PBAn5@ SPARE AREA |
| DataInformation "0101" | PBAm6@ INNER OR OUTER PERIPHERAL AREA | PBAn6@ SPARE AREA |

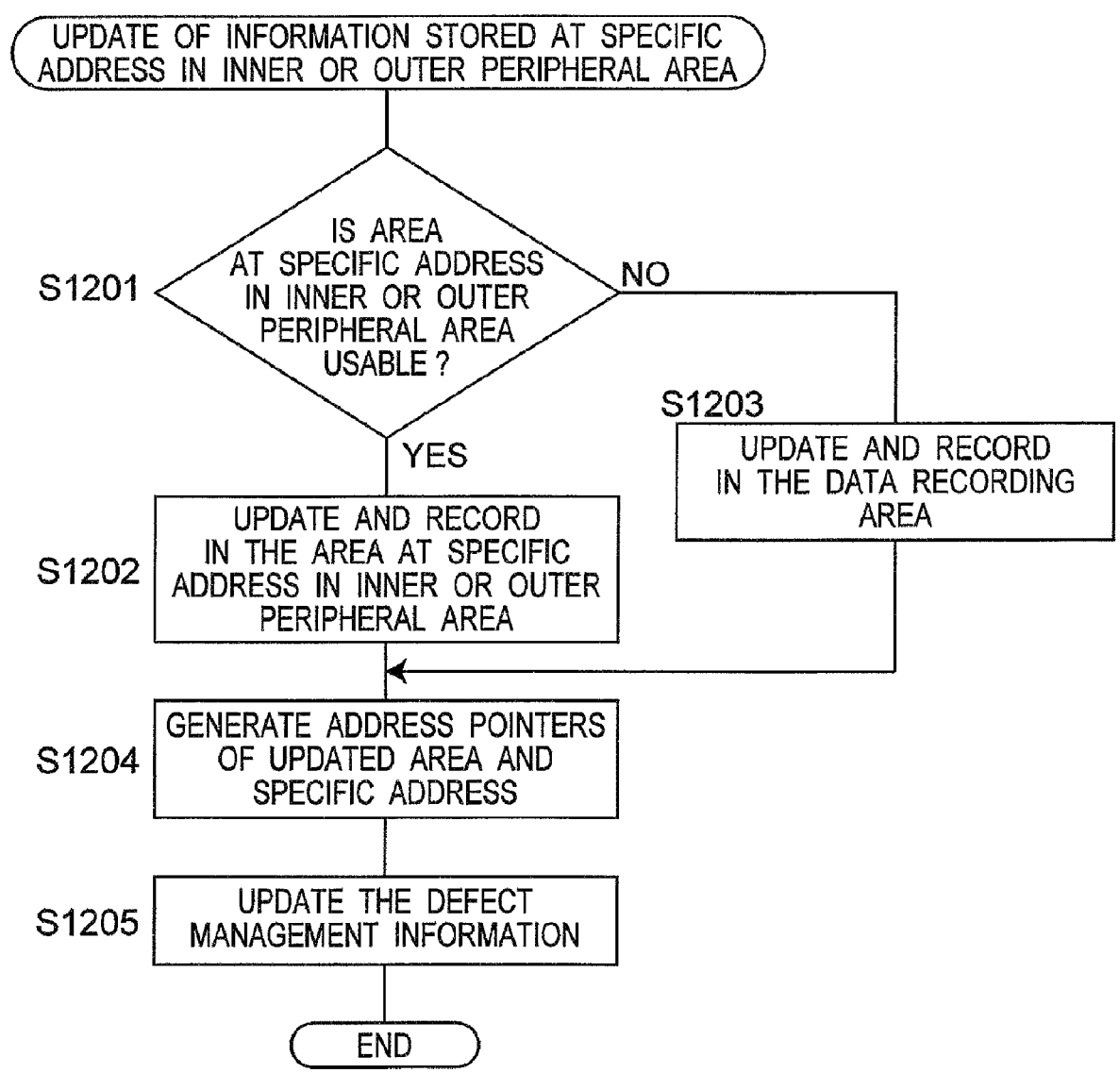

METHOD AND AN APPARATUS FOR RECORDING INFORMATION, AND AN INFORMATION RECORDING MEDIUM

This is a divisional application of U.S. patent application Ser. No. 10/849,179, filed May 20, 2004 now U.S. Pat. No. 7,453,781.

The present disclosure relates to subject matter contained in Japanese Patent Application No. 2003-141716, filed on May 20, 2003, which is expressly incorporated herein by reference in its entirety.

BACKGROUND OF THE INVENTION

1. Technical Field

The present invention relates to an information recording medium for recording digitized information, and more particularly to an information recording medium having an area for managing defects of the medium. The present invention relates to a method and an apparatus for recording information in such information recording medium.

2. Related Art

In the background of advancement of information technology society, transmission of information continues to be faster in speed and greater capacity, and the information recording medium for recording and storing the information is also demanded to be faster in speed and greater in capacity.

In a rewritable recording medium represented by an optical disk, in order to assure reliability of recorded information by overcoming initial defects such as pin holes generated in the manufacturing process or secondary defects such as flaw and stain occurring due to use, generally, a function known as replacement process is implemented. In the replacement process, if a track that is supposed to record certain information has an error and is regarded as defective, this track is not used, and information is recorded on another replacement track.

In a data recording track, individual address information is pre-recorded in a different system (with change in groove shape, for example) from the recording data (with phase change of recording film, for example). In relation to the prerecorded address information, generally, a relative position of the recording position of address information and the recording data are determined in advance. In an apparatus for writing information in such an information recording medium, the data is recorded and reproduced while referring to the individual address information, and therefore in the case of a replacement process, the address information of the defective track and the address information of the track replacing the defective track must be managed as a history of the replacement process. Such process is generally called "defect management."

In the case of a rewritable recording medium, in particular, since one medium may be used by plural apparatuses, it often includes a defect management area to be used exclusively for defect management.

Incidentally, if an attempt is made to raise the recording density of information in order to increase the capacity of the information recording medium, a higher precision is demanded in recording and reproduction of information. On the other hand, recording and reproducing characteristics vary depending on manufacturing fluctuations of a recording medium and an apparatus, or temperature changes and other factors in the operating environment of the apparatus. Therefore, to record and reproduce with precision regardless of any environmental changes, optimization of the recording and reproducing conditions is required.

To solve this problem, various ideas have been proposed, including a method of optimizing the recording and reproducing conditions by combining the recording medium and apparatus, and a recording medium having a test recording area for optimizing the recording and reproducing conditions (for example, see patent document 1).

Further, it is also proposed to enhance the optimization process efficiency (increase of speed of a starting process of the apparatus) by providing a drive information recording area for storing the result of optimization of recording and reproducing conditions by combining the recording medium and apparatus (for example, see patent document 2).

Patent Document 1: Japanese Patent No. 3099009
Patent Document 2: Japanese Patent No. 3285338

The above described methods, however, fail to refer to a process if a recording area for a specific application, such as test recording area or drive information recording area, becomes unusable.

If the test recording area is unusable, in the recording apparatus, the recording and reproducing conditions cannot be optimized, and it is difficult to assure the reliability of the recorded information. If the drive information recording area is unusable, in the recording apparatus, the result of optimization of recording and reproducing conditions cannot be stored, and thus an optimization process is required from the beginning when turning on the power source of the recording apparatus again or when replacing the recording medium. Accordingly an effect of speeding up of the starting process is lost.

An example of a case in which the specific application area becomes unusable, is known as a write-once medium. In the write-once medium, the same track cannot be recorded a plurality of times, and the number of times test recording or updating drive information is limited.

Or in a case of a recording medium being allowed to overwrite in the same track, if the number of times of rewriting is limited, such medium has the same problems. In particular, the test recording applies an excessive stress to the medium by overpower recording in a process of determining the optimum recording conditions, and the rate of deterioration is faster than in other areas, thus resulting in a problem in that the number of times of rewriting may be limited by the number of times of test recording.

SUMMARY OF THE INVENTION

The invention is devised to solve the above problems, and it is hence an object of the invention to present an information recording medium, an information recording method, and an information recording apparatus capable of preventing problems such as failure in recording of new information or a drop of reliability of recording if a recording area for specific application such as a test recording area or a drive information recording area becomes unusable.

In a first aspect of the invention, a method is provided for recording information on an information recording medium having a data recording area for storing user data and a non-user data area used for other purposes than recording user data. The method includes: recording, in the data recording area, the information intended to be recorded in the non-user data area; and recording management information in a predetermined area, the management information relating to the recording of the information intended to be recorded in the non-user data area in the data recording area.

In a second aspect of the invention, a method is provided for recording information on an information recording medium having a data recording area for storing user data, and a test area used for test recording by a recording apparatus. The method includes: detecting whether the test area is unusable when executing the test recording; executing the test recording in the test area when the test area is detected not to be unusable, or executing the test recording in the data recording area when the test area is detected to be unusable; and recording, in a predetermined area, management information relating to the test recording executed in the data recording area.

In a third aspect of the invention, a method is provided for recording information on an information recording medium having a data recording area for storing user data and a control information recording area for storing control information other than the user data. The method includes: detecting whether the control information recording area is unusable; when recording the control information, recording the control information in the control information recording area when the control information recording area is detected not to be unusable, or recording the control information in the data recording area when the control information recording area is detected to be unusable; and recording management information in a predetermined area, the management information relating to the recording of control information in the data recording area.

In a fourth aspect of the invention, an information recording medium is provided including: a data recording area for storing user data; and a non-user data area used for other purpose than recording of the user data. The data recording area includes: an area usable for storing information intended to be recorded in the non-user data area; and an area for storing management information relating to the recording of the information intended to be recorded in the non-user data area in the data recording area.

In a fifth aspect of the invention, an information recording medium is provided having: a data recording area for storing user data; and a test area used for test recording by a recording apparatus. The data recording area includes: an area usable for test recording when the test area is unusable; and a management area for storing management information relating to the test recording executed in the data recording area.

In a sixth aspect of the invention, an information recording medium is provided having: a data recording area for storing user data; and a control information recording area for storing drive control information including recording and reproducing conditions depending on the combination of the recording apparatus and medium. The data recording area includes; an area usable in recording of further drive control information when the control information recording area is unusable; and a management area capable of storing management information regarding the drive control information recorded in the data recording area.

In a seventh aspect of the invention, an information recording apparatus is provided for recording information while optimizing recording and reproducing conditions on an information recording medium. The information recording medium has a data recording area for storing user data; a defect management area used for defect management of the data recording area; a test area used for test recording; and a control information recording area for storing drive control information including the recording and reproducing conditions depending on the combination of the apparatus and medium. The apparatus includes: a detecting unit that detects whether the test area and the control information recording area are unusable; a test recording unit that makes test recording, in the test area when the test area is detected not to be unusable by the detecting unit, or in the data recording area when detected to be unusable; a drive control information updating unit that updates and records the drive control information including the optimum recording and reproducing conditions obtained on the basis of the execution result of the test recording, in the control information recording area when the control information recording area is detected not to be unusable by the detecting unit, or in the data recording area when detected to be unusable; and a management information recording unit that records management information, the management information including at least one of a first address pointer indicating the location of the test recording, and a second address pointer indicating the location at which the drive control information is updated and recorded.

In an eighth aspect of the invention, a method is provided for recording information in a predetermined direction to a continuous area on an information recording medium. The method includes: making test recording in an unused area following an area in which information has been already recorded, when recording additionally desired information on the information recording medium; and recording the desired information in an area following the area in which the test recording is made.

In a ninth aspect of the invention, an information recording medium is provided for recording information in a predetermined direction in a continuous area. When recording additionally desired information, a test recording is made in an unused area consecutive to the area in which information has been already recorded. The desired information is recorded in an area following the area in which the test recording is made.

In a tenth aspect of the invention, an apparatus is provided for recording information in a predetermined direction in a continuous area on an information recording medium. The apparatus has: a recording unit that records information to the information recording medium: and a controller that controls the operation of the recording unit. When recording additionally desired information to the information recording medium, the controller controls the recording unit so that the test recording is made in an unused area consecutive to the area at which the information has been already recorded and the desired information is recorded in an area following the area in which the test recording is made.

In an eleventh aspect of the invention, an apparatus is provided for recording information on an information recording medium having a data recording area for storing user data; and a non-user data area used for another purpose than recording of the user data. The apparatus includes: a recording unit that records information to the information recording medium; and a controller that controls the operation of the recording unit. The controller controls the recording unit so that the information intended to be recorded in the non-user data area is recorded in the data recording area; and management information is recorded in a predetermined area, the management information relating to the recording of the information intended to be recorded in the non-user data area in the data recording area.

In a twelfth aspect of the invention, an apparatus is provided for recording information on an information recording medium including: a data recording area for storing user data; and a test area used for test recording. The apparatus includes: a recording unit that records information to the information recording medium; and a controller that controls the operation of the recording unit. The controller controls the recording unit so that detection whether the test area is unusable is performed when executing the test recording; a test recording is executed in the test area when the test area is detected not to be unusable, or executed in the data recording area when detected to be unusable. Management information relating to test recording executed in the data recording area is recorded in a predetermined area.

In a thirteenth aspect of the invention, an apparatus is provided for recording information on an information recording medium having a data recording area for storing user data; and a control information recording area for storing control information other than the user data. The apparatus includes; a recording unit that records information to the information recording medium; and a controller that controls the operation of the recording unit. The controller controls the recording unit so that it is detected whether the control information recording area is unusable when recording the control information; the control information is recorded in the control information recording area when the control information recording area is detected not to be unusable, or recorded in the data recording area when the control information recording area is detected to be unusable; and management information is recorded in a predetermined area. The management information relates to recording of control information in the data recording area.

In a fourteenth aspect of the invention, a controller is provided for controlling a recording unit which records information on an information recording medium. The controller controls the recording unit so as to record information in a predetermined direction in a continuous area on the information recording medium. When recording additionally desired information to the information recording medium, the controller controls the recording unit so that test recording is made in an unused area consecutive to the area at which the information has been already recorded and the desired information is recorded in an area following the area in which the test recording is made.

In a fifteenth aspect of the invention, a controller is provided for controlling a recording unit which records information on an information recording medium having: a data recording area for storing user data; and a non-user data area used for another purpose than recording of the user data. The controller controls the recording unit so that the information intended to be recorded in the non-user data area is recorded in the data recording area; and management information is recorded in a predetermined area, the management information relating to the recording of the information intended to be recorded in the non-user data area in the data recording area.

In a sixteenth aspect of the invention, a controller is provided for controlling a recording unit which records information on an information recording medium having a data recording area for storing user data, and a test area used for test recording. The controller controls the recording unit so that detection whether the test area is unusable is performed when executing the test recording; a test recording is executed in the test area when the test area is detected not to be unusable, or executed in the data recording area when detected to be unusable; and management information relating to the test recording executed in the data recording area is recorded in a predetermined area.

In a seventeenth aspect of the invention, a controller is provided for controlling a recording unit which records information on an information recording medium including: a data recording area for storing user data; and a control information recording area for storing control information other than the user data. When recording the control information, the controller controls the recording unit so that it is detected whether the control information recording area is unusable; the control information is recorded in the control information recording area when the control information recording area is detected not to be unusable, or recorded in the data recording area when the control information recording area is detected to be unusable; and management information is recorded in a predetermined area, the management information relating to the recording of the control information in the data recording area.

Effects of the Invention

According to the invention, when the test recording area used for determining the optimum recording and reproducing conditions by combining the recording medium and recording apparatus is detected to be unusable, a test recording is made in the data recording area, and the management information including the address pointer showing the location of test recording is recorded in the information recording medium, so that the number of times of execution of test recording is not limited by the size of the test recording area.

Also according to the invention, when the drive control information area for storing the drive control information including the optimum recording and reproducing conditions by combining the recording medium and recording apparatus is detected to be unusable, the drive control information is recorded in the data recording area, and the management information including the address pointer showing the location of the drive control recording information recorded in the information recording medium, so that the number of times of updating the drive control information is not limited by the size of the drive control information area.

Therefore, avoiding failure of the addition of information due to test recording failure or decline of reliability of information recording is effective. Also, consuming starting time by repeating optimization of recording and reproducing conditions from the beginning every time upon start due to a failure in updating drive control information is effective so that the reliability of efficient and fast information recording may be assured all the time.

Further according to the invention, by recording the management information in the defect management area, necessary information for various processes can be managed in a batch by using the defect management area, and the system efficiency can be excellently enhanced Therefore, the information recording medium, information recording method and information recording apparatus of the invention bring about the greatest effects when applied. For example, the invention is applicable to large capacity optical disk media such as rewritable and write-once type, and a video disk recorder.

BRIEF DESCRIPTION OF THE DRAWINGS

FIG. 7 is a diagram showing an example of a structure and a sequence of using a two-layer recording disk 101a in Embodiment 1 of the invention.

FIG. 8 is a diagram showing an example of a defect management list structure in Embodiment 1 of the invention.

FIG. 9 is a flowchart showing an example of an updating process for specific information included in the non-user data area in Embodiment 1 of the invention.

FIGS. 15A to 15C are diagrams explaining an information adding procedure in the write-once type optical disk medium using a linking method in Embodiment 3 of the invention.

DETAIL DESCRIPTION OF THE EMBODIMENTS

Embodiments of the invention are described below with reference to the accompanying drawings by using a write-once type optical disk recording medium as an example of an information recording medium of the invention.

Embodiment 1

Figure 1:
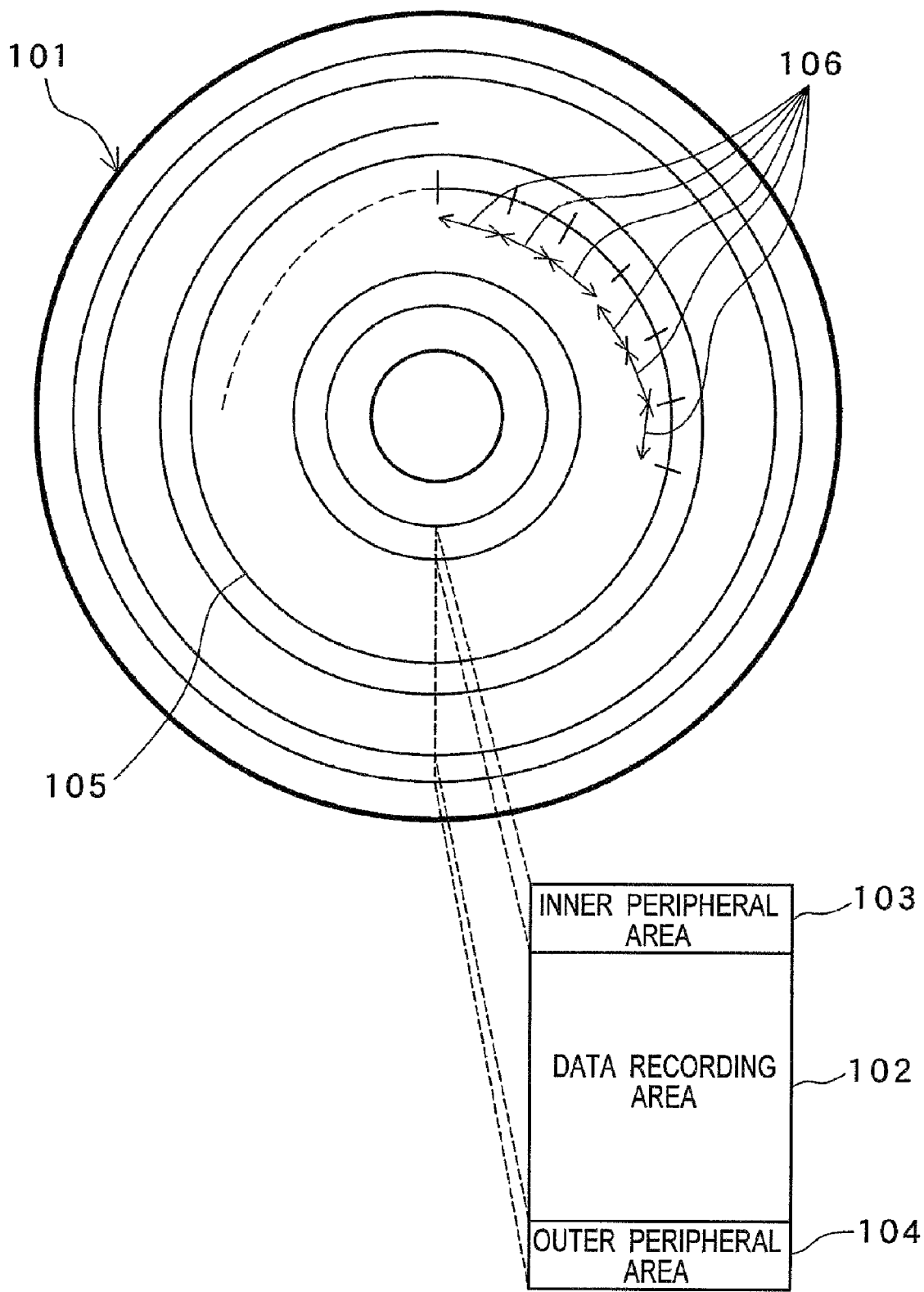
FIG. 1 is a diagram showing an example of an optical disk medium structure 101 in Embodiment 1 of the invention.

FIG. 1 is a schematic diagram of an optical disk medium in an embodiment of the invention. As shown in FIG. 1, on a recording surface of an optical disk medium 101, a guide groove (hereinafter called "groove") is spirally formed. In an information track 105, an address information (not shown) showing the absolute position on the disk represented by a groove shape change is prerecorded.

Although not shown in the drawing, an organic pigment recording film is formed on the recording surface of the optical disk medium 101. The recording apparatus emits the laser beam onto the recording film while reducing the beam spot of laser beam and modulating the laser power depending on the recording data to cause change of the organic pigment material of the recording film by a local temperature rise, so that information is recorded. The optical disk medium of the embodiment is of a write-once type and information can be added. However, once recorded in the information track, recorded information cannot be erased or rewritten.

The address information includes information for specifying the position of a recording block 106 which is a unit of recording data. In the recording apparatus and reproducing apparatus, by reproducing the information track 105 and reading the address information, the recording block 106 can be specified.

The optical disk medium 101 includes a data recording area 102; an inner peripheral area 103; and an outer peripheral area 104. As shown in FIG. 1, in the recording apparatus, the area used for recording the user data is the data recording area 102; and the inner peripheral area 103 disposed inside the data recording area 102 and outer peripheral area 104 disposed outside are used for specific applications other than recording user data.

Figure 2:
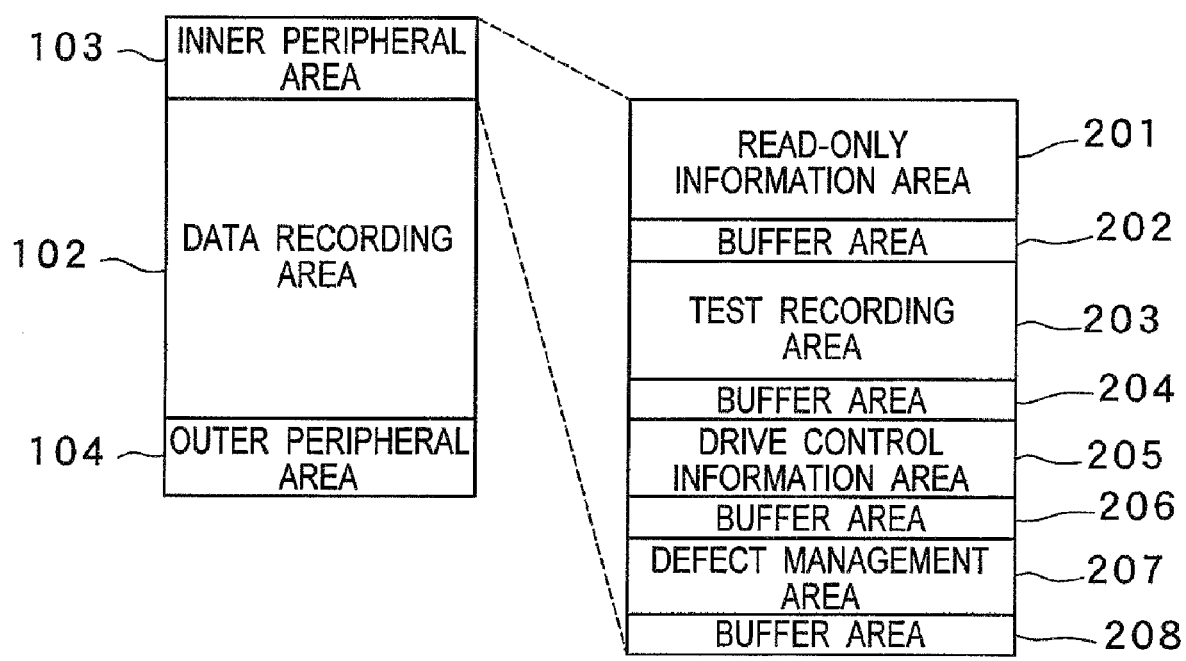
FIG. 2 is a diagram showing the area structure of optical disk medium 101 in Embodiment 1 of the invention, particularly showing an internal structure of inner area 103.

FIG. 2 shows more specifically the internal composition of the inner peripheral area 103 of the optical disk medium 101. The inner peripheral area 103 includes, sequentially from the innermost side, a read-only information area 201; a buffer area 202; a test recording area 203; a buffer area 204; a drive control information area 205; a buffer area 206; a defect management area 207; and a buffer area 208.

The read-only information area 201 is an area for prerecording information such as identification information of the optical recording medium 101, with shape changes of convex and concave pits (emboss), and a groove of the recording surface in the manufacturing process of the disk. The read-only information area 201 is an area for reading only, as the name suggests, and the information recorded herein is not altered, in principle.

The test recording area 203 is an area used for test recording in the operation for optimization of recording and reproducing conditions, by combining the optical disk medium 101 and recording apparatus as previously explained in "Related Art". The test recording procedure is specifically described later.

The drive control information area 205 is an area for storing, as the drive control information, the optimization result of recording and reproducing conditions determined by the method of test recording or the like. The content of the recording and reproducing conditions and the updating method of drive control information are specifically described later.

The defect management area 207 is an area used in general defect management, and is used as an area for storing the address information of the original recording block in which a defect is found in the data recording area 102, or address information of the replacement recording block of the defect block, as defect management information. The defect management area 207 is also used for management of the condition of use of the test recording area 203 or drive information recording area 205, aside from the defect management of general data recording area 102, which is one of the features of the invention. This is also described specifically below.

The areas 202, 204, 206 and 208 are provided as buffer areas between adjacent areas, and information is not recorded therein.

Figure 3:
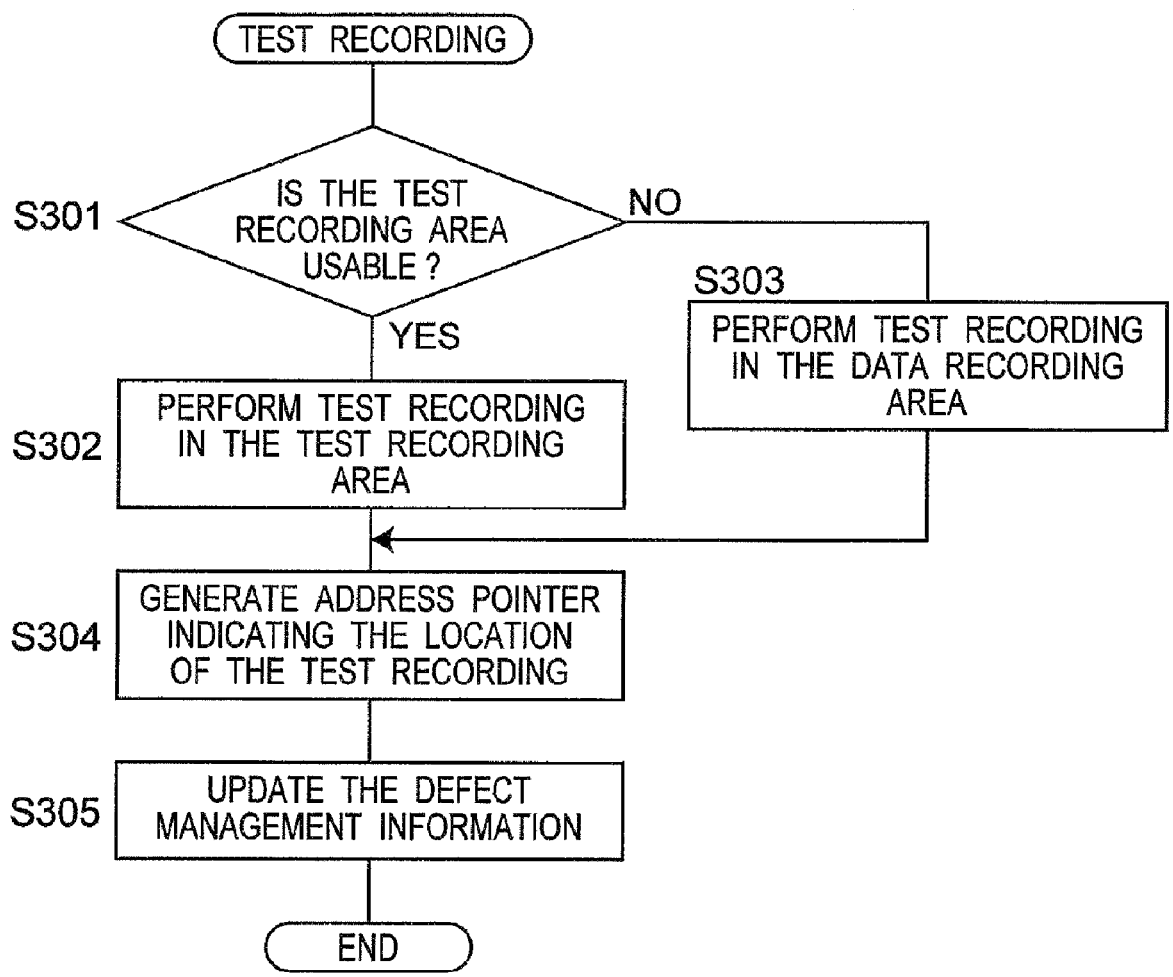
FIG. 3 is a flowchart showing an example of a test recording procedure in Embodiment 1 of the invention.

FIG. 3 is a flowchart showing the procedure of test recording in the information recording method of the invention.

When the procedure of test recording is started, first of all, it is checked whether the test recording area 203 is usable or not (step S301). Since the optical disk medium 101 of the present embodiment is of a write-once type, when checking whether the test recording area 203 is usable or not, it is sufficient to check whether there is an unused (unrecorded) recording block in the test recording area 203.

When an unrecorded block is judged to be present, that is, when the test recording area 203 is usable, a test recording is made by using the unrecorded block in the test recording area 203 (step S302). If an unrecorded block is not judged to be present, that is, when the test recording area 203 is unusable, a test recording is made by using the specified unrecorded block in the data recording area 102 (step S303).

When test recording is executed in the test recording area 203 or data recording area 102, address information showing the position of a recording block of test recording is held as an address pointer (step S304), and the information including the held address pointer is updated as defect management information (step S305). Then, the test recording is terminated.

At step S301, there is a method of searching the unrecorded block including scanning all information tracks in the test recording area 203 by the recording apparatus, and checking an unrecorded block on the basis of the reproduction signal from the medium. In this method, however, as the number of tracks in the test recording area 203 increases, it is time consuming to retrieve an unrecorded block, and it is not efficient. Considering this point, at step S305, similarly to the defect block of the data recording area 102, the used recording blocks are registered by using the defect management area 207. A method of registration into defect management information is described specifically below.

By test recording in this procedure, even if all recording blocks in the test recording area 203 are used up and unusable, test recording is possible by using the data recording area 102. Therefore, if the test recording area 203 becomes unusable, it is possible to optimize recording and reproducing conditions in combining the optical disk medium 101 and the recording apparatus, and hence the reliability of recording information is not lowered, and failure of writing of new information is avoided.

According to the method explained so far, in order to increase the number of times of writing information, increasing the capacity of the test recording area 203 more than necessary is not required, in considering the number of times of test recording. Also, the information can be written efficiently in general in the optical disk medium 101. As a result, rewritable type and write-once type optical disk media can be provided easily in the same physical format (area structure), and the manufacturing cost of optical disk media can be reduced.

Figure 4:
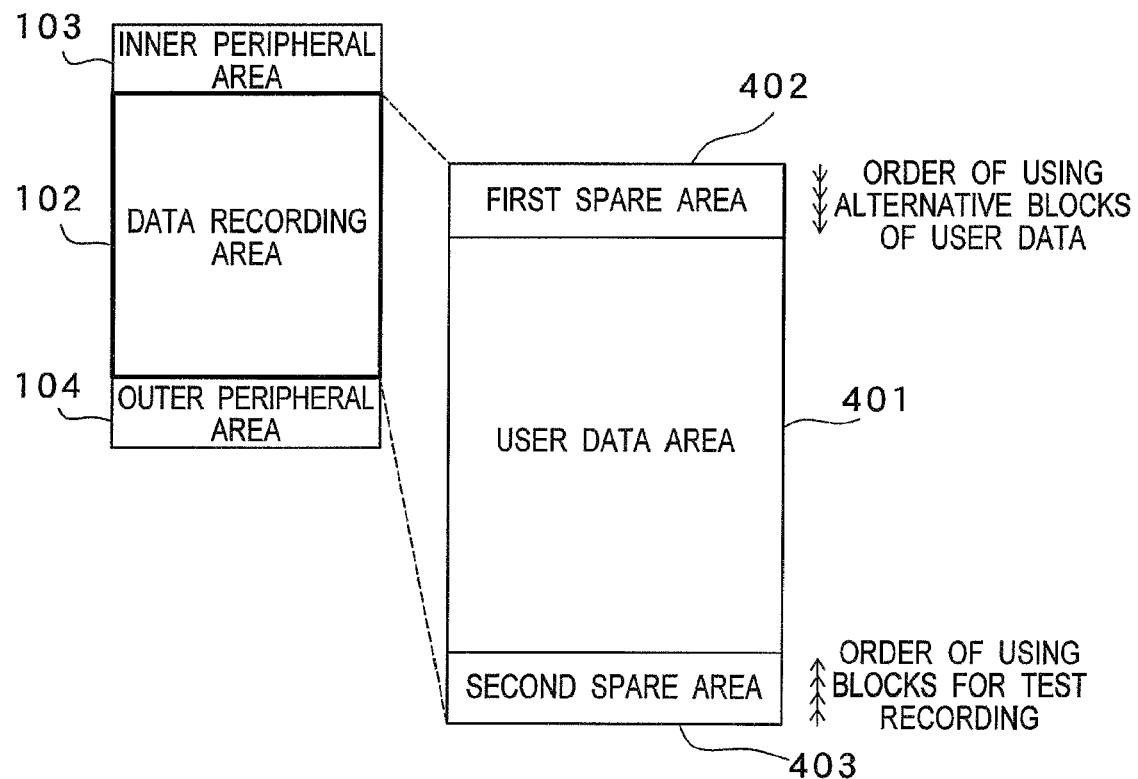
FIG. 4 is a diagram showing an example of an internal structure and sequence of use of data recording area 102 in Embodiment 1 of the invention.

It is one of the features of the invention that test recording is executed by making use of the data recording area 102, and an example of the order of using an area in the data recording area 102 for the test recording is shown in FIG. 4.

FIG. 4 shows the area structure of the optical disk medium 101, in particular, an example of an internal structure of data recording area 102 is shown. The data recording area 102 is divided, sequentially from the inner side, into the first spare area 402, a user data area 401, and the second spare area 403.

For a replacement process (known linear replacement method) of the user data area 401, the area of the optical disk medium 101 is utilized from the information track at the innermost position of the first spare area 402 to the outer direction. For test recording, the area of the optical disk medium 101 is utilized from the information track at the outermost position of the second spare area 403 to the inner direction.

In this way, in the radial direction of the optical disk medium 101, the replacement block of the user data and the area for test recording are used from a mutually reverse direction, and hence there is no confusion between a recording block of user data and an area for test recording. Therefore, in test recording, if recorded by overpower (higher power than optimum laser power) or recorded by special method (for example, recording of a specific data pattern not conforming to the modulation code), no adverse effect is given to recording and reproduction of user data, so that the stability of the recording apparatus may be maintained.

The capacity of the first spare area 402 and the second spare area 403 may be determined preliminarily in the so-called physical format processing, or the capacity of at least one area may be changed flexibly. If many defective blocks are caused and the first spare area 402 is used up for replacement of user data, the second spare area 403 may be used. Or, if the second spare area 403 is used up for test recording, the first spare area 402 may be used. In this case, there is no problem if it is designed to use both areas from opposite directions in the radial direction of the optical disk medium 101.

In another method, the spare area for storing user data and the spare area for test recording may be preliminarily allocated as different areas. In this method, user data recording and test recording can be clearly separated, and it is not required to determine the sequence of using the recording areas.

Figure 5:
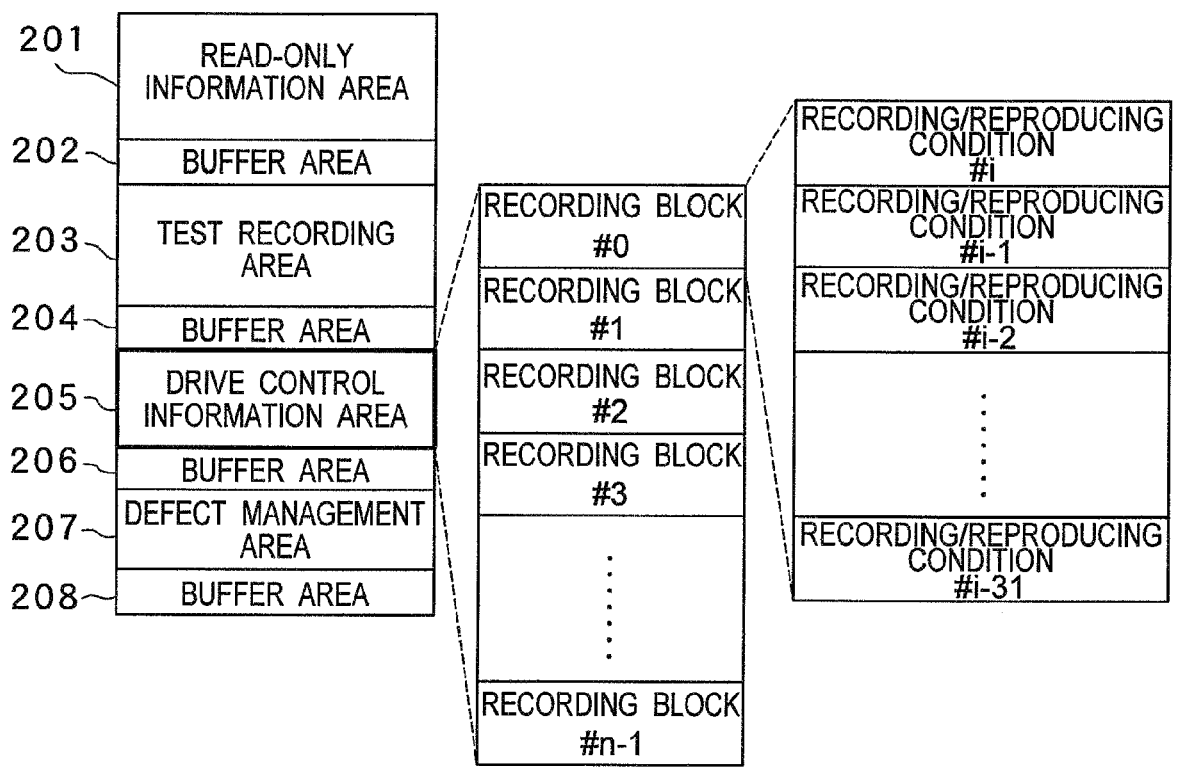
FIG. 5 is a diagram showing an example of an internal structure of drive control information area 205 in Embodiment 1 of the invention.

FIG. 5 specifically shows the internal structure of the drive control information area 205 of the optical disk medium 101. The drive control information area 205 includes plural recording blocks (a total of n recording blocks in FIG. 5). Each recording block can include a plurality of recording and reproducing conditions (in FIG. 5, a maximum of 32 recording and reproducing conditions per recording block).

By including a plurality of recording and reproducing conditions in one recording block which is the unit of recording operation, the recording and reproducing conditions can be recorded for the combination of the optical disk medium and one or more recording apparatuses. A list composed of a plurality of recording and reproducing conditions is called "a recording and reproducing condition list". Since the drive control information area 205 includes n recording blocks, the drive control information including the plurality of recording and reproducing conditions can be updated n times.

In the case of the rewritable optical disk medium, overwriting the recorded block already recorded in the drive control information area is allowed, and hence, the same recording block only can be used continuously unless the recording block becomes unusable due to defect or deterioration.

However, in the case of a write-once type recording medium such as the case of the optical disk medium 101 of the present embodiment, the recording block already recorded in the drive control information area 205 cannot be erased or rewritten. Therefore, if it is desired to change the contents in the recording block, it is required to write information newly into another recording block in the drive control information area 205, and hence the number of times of updating of the drive control information is limited by the number of recording blocks included in the drive control information area 205.

In the invention, accordingly, to avoid the inconvenience of failure of recording of new recording and reproducing conditions due to complete consumption of the drive control information area 205, it is designed to update the drive control information area also by using the data recording area.

Figure 6:
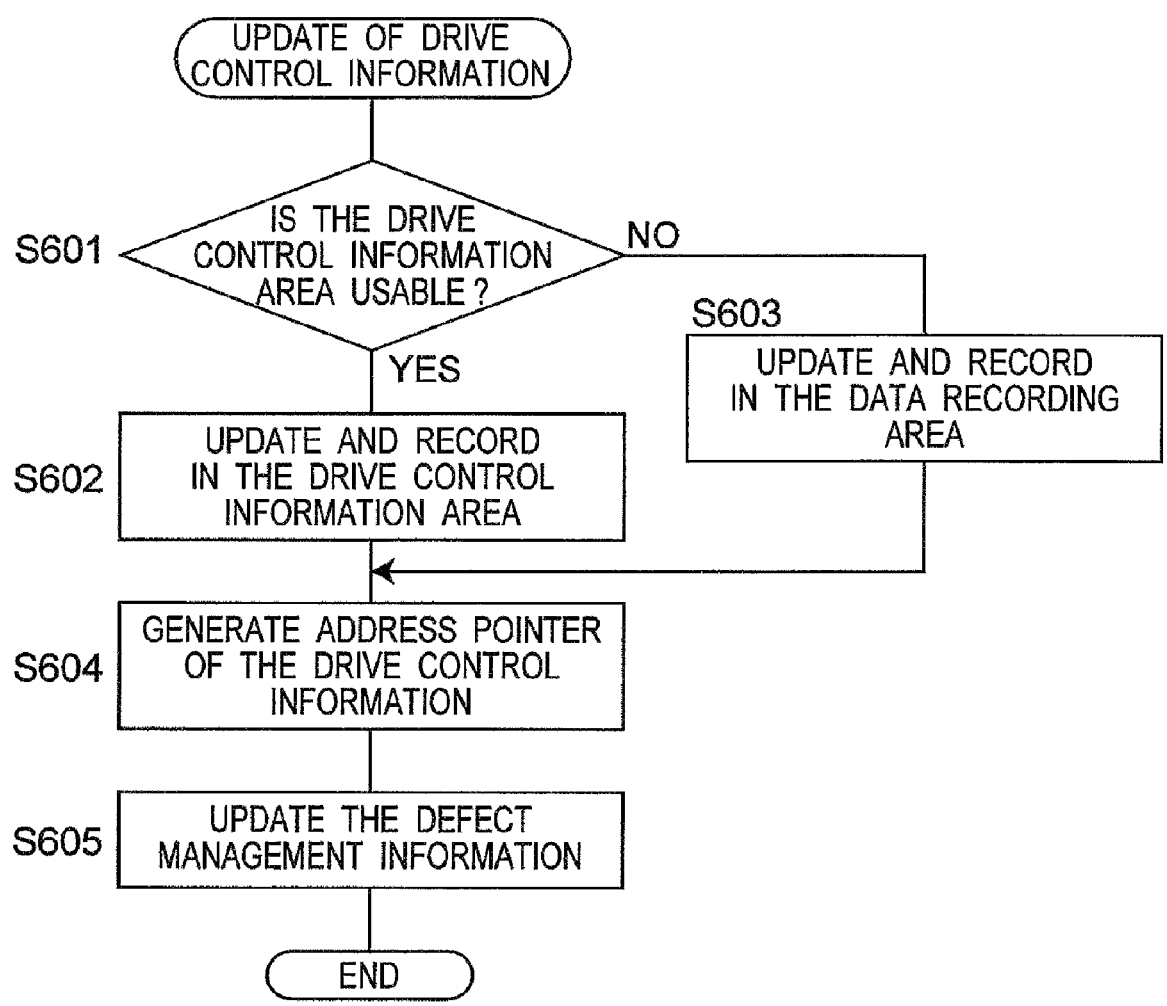
FIG. 6 is a flowchart showing an example of an updating procedure of drive control information in Embodiment 1 of the invention.

FIG. 6 is a flowchart showing an updating procedure for an information recording method of the invention, in particular, the drive control information.

When an updating process of drive control information is started, it is first checked whether the drive control information area 205 is usable or not (step S601). Since the optical disk medium 101 in this embodiment is of a write-once type, whether the drive control information area 205 is usable or not may be known by checking for the presence of an unused recording block (unrecorded block) in the drive control information area 205.

When an unrecorded block is judged to be present, that is, when the drive control information area is judged to be usable, the drive control information is updated and recorded in the unrecorded block in the drive control information area 205 (step S602). If an unrecorded block is judged not to be present, that is, when the drive control information area is judged to be unusable, the drive control information is updated and recorded in the specified unrecorded block in the data recording area 102 (step S603).

When the drive control information is updated and recorded in the drive control information area 205 or data recording area 102, the address information showing the position of a recording block to which the drive control information is updated is held as an address pointer (step S604), and the information including the held address pointer is updated as defect management information (step S605). Then, updating of drive control information is terminated.

At step S601, similar to the test recording procedure explained above, there is a method of searching the unrecorded block including scanning all information tracks in the drive control information area 205, and checking an unrecorded block on the basis of the reproduction signal from the medium. In this method, however, as the number of tracks in the drive control information area 205 increases, it is time consuming to retrieve an unrecorded block, and it is not efficient. Considering this point, at step S605, similar to the defect blocks of the data recording area 102, the used recording blocks are registered by using the defect management area 207. A method of registration into defect management information is described specifically below.

By updating the drive control information in the procedure as explained above, if all recording blocks in the drive control information area 205 are used up and unusable, the drive control information can be updated by using the data recording area 102. Therefore, if the drive control information area 205 is unusable, optimum recording and reproducing conditions in the combination of the optical disk medium 101 and the recording apparatus can be maintained, and hence the loss of repeating again the process of test recording upon every start of the recording apparatus is eliminated, and the starting time of the recording apparatus can be enhanced.

According to the method explained thus far, in order to increase the number of times of updating the drive control information, increasing the capacity of the drive control information area 205 is not required, so that the information can be efficiently written once on the optical disk medium 101 in general. As a result, rewritable type and write-once type optical disk media can be provided in the same physical format (area structure), and the manufacturing cost of optical disk media can be reduced.

Incidentally, step S305 in the test recording procedure shown in FIG. 3 and step S605 in the updating procedure of drive control information shown in FIG. 6 are both intended to update the defect management information, and are hence duplicate processes. In the ordinary system, in an optimization process of recording and reproducing conditions, test recording and drive control information recording are usually executed in series, and the two steps can be combined. Updating the defect management information is ideal at the end of a series of processes for optimizing the recording and reproducing conditions, because it leads to shortening processing time and curtailment of area.

In the optimization process of recording and reproducing conditions, updating of defect management information is not always required. Results of optimization of recording condition may be temporarily held in a nonvolatile memory and recorded on the information recording medium until the power source of the apparatus is turned off. Therefore, in the midst of the updating process of defect management information of the prior art generally known as flash memory, recording the management information at the same time is sufficient. Thus, it leads further to shortening of the required processing time and curtailment of the area. A preferred example about contents of the defect management information is described later.

FIG. 7 shows an example of order in use of the areas used as the areas for test recording in a two-layer recording disk.

The two-layer recording disk 101a is a write-once type optical disk medium, and has a structure in which there are two independent layers of information recordable surfaces. As a result, the recording capacity of two-layer recording disk is twice the capacity of a single-layer (one layer of recording surface only) disk having the same track pitch and bit line density.

As shown in FIG. 7, an optical head 902 records information by emitting the laser spot to the recording surface of the two-layer recording disk 101a. The two layers of recording surface of the two-layer recording disk 101a are called, for the sake of convenience, "layer A" for the layer farther from the optical head 902 (farther from the laser irradiation surface (information recording surface) of the two-layer recording disk) and "layer B" for the layer closer to the optical head 902 (closer to the laser irradiation surface). On the recording surfaces of the layers A and B, although not shown in the drawing, spiral grooves (information tracks) are formed similarly to the optical disk medium 101, and plural areas are included as described below.

The layer A includes, sequentially from the inner side, a test recording area 703a, a defect management area 704a, a spare area 705a, a user data area 706a, and a spare area 707a. The layer B includes, sequentially from the inner side, a test recording area 703b, a defect management area 704b, a spare area 705b, a user data area 706b, and a spare area 707b.

The order in use of areas for test recording into the two-layer recording disk 101a is explained below. In the case of the first test recording from the fully unrecorded state, the operation is started by using the test recording area 703a in the layer A. In this embodiment, the test recording area 703a is used from the inner side to the outer side (in an arrow direction shown as (1) in FIG. 7). When the test recording area 703a is used up, the test recording area 703b of the layer B is next used (sequence (2)).

The reason for using the layer A before the layer B is to prevent effects of test recording in the layer B on the recording and reproduction of the layer A. That is, if a test recording is made in the layer B which is closer to the optical head 902, when reproducing the same radial position of the layer A, the transmissivity of the laser beam passing the layer B changes slightly depending on the test recording state of the layer B, and the laser exit light quantity reaching the layer A or the reflection light quantity from the layer A may be varied. In particular, in the case of test recording, unlike ordinary user data recording, there is a possibility of overpower recording or data pattern recording not conforming to a data modulation rule, and there is a risk of influence on measurement of recording and reproducing conditions using the layer A.

When the test recording areas 703a and 703b are all used up, similar to the case as explained for the single-layer optical disk medium 101, the spare areas 707a, 707b of the outer side are used. In this embodiment, first, the spare area 707a of the layer A is used from the outer side (shown by arrow of (3) in FIG. 7), and when the spare area 707a is used up, the spare area 707b of the layer B is used from the outer side (shown by arrow of (4) in FIG. 7). The reason for using the layer A before the layer B is the same as explained above.

Thus, as explained by referring to FIG. 7, in the case of test recording for the two-layer optical disk, by using the layer farther from the optical head, recording is more stable without giving influence on the recording and reproducing condition. Also in the two-layer optical disk, similarly, if the recording areas 703a and 703b are used up and unusable, then test recording can be continued by using the spare areas 707a and 707b.

According to the method described herein, in order to increase the number of times of writing of information, increasing the capacity of the recording areas 703a, 703b more than necessary is not required considering the number of times of test recording, and thus the information can be written efficiently generally on the optical disk medium 101a. As a result, rewritable type and write-once type optical disk media can be provided in the same physical format (area structure), and the manufacturing cost of optical disk media can be reduced.

In this example, as shown in FIG. 7, the order of use of the test recording is from area 703a, through area 703b and area 707a, to area 707b, but the sequence is not limited to this example alone.

The order of areas for test recording in the two-layer disk may be determined depending on the recording sequence of user data. For example, when recording of user data is started from the layer A side, that is, the user data area 706a, and after using up the user data area 706a, the layer B (user data area 706b) is used, in test recording the areas may be used in the order of area 703a, area 707a, area 703b, and area 707b according to the order in using areas for the user data recording.

In another example, only one recording layer may be used. For instance, by using the layer A only, the area 703a and area 707a may be used in this sequence; or by using the area B only, the area 703b and area 707b may be used in this sequence. In this case, the size of the usable area is ½, but the recording condition can be optimized without any effect in the recording state from another layer.

In a further different embodiment, the test recording radial position may be separated in every recording layer. For instance, the test recording area 703b is used for test recording of layer B, and the spare area 707a is used for recording of layer A. Or, for test recording of layer A, the test recording area 703a is used from the inner side, and for test recording of layer B, the test recording area 703b is used from the outer side. In either method, there is a limit in the size of area usable for test recording, but if necessary to optimize the recording and reproducing conditions in every recording layer even in the same medium, the recording condition can be optimized without any effect in the recording state from another layer.

The method explained herein can be applied also to a multilayer optical disk having three or more recording layers.

FIG. 8 shows an example of a structure of a defect management list in the preferred embodiment of the invention.

The defect management list is a part of information recorded in the defect management area of the optical disk medium (corresponding to the defect management area 207 in the optical disk medium 101, or the defect management areas 704a and 704b in the two-layer recording disk 101a). Generally, in the defect management list, the address information of the defect recording block showing the absolute position of the recording block regarded to be defective, and the address information of the replacement recording block showing the absolute position of the recording block for recording the information to be recorded in the defect recording block. The address information of the defect recording block and the address information of the replacement recording block correspond to each other and are registered as list elements.

In the embodiment, as shown in FIG. 8, the address information of the recording block to which test recording is applied and recording block to which the drive control information is recorded can be included in the defect management list. Type information identifiers are provided so that it is possible to determine under what operating status the elements registered in the list were registered.

FIG. 8 shows six registration examples. Each registration example is explained below.

The first example shows the registration with type information identifier "0000" showing "normal (replaced)." It shows defect registration by ordinary user data recording, and it is registered as a result of a replacement process by a known linear replacement method. Address information of defect recording block records PBAm1 (actually the numeral indicating the address information is given) showing the absolute address of the recording block in the data recording area regarded to be a defect, and address information of replacement recording block records PBAn1 showing the absolute address of recording block in the spare area for replacement.

The second example shows registration with type information identifier "0001" showing "normal (non-replaced)." It shows registration of recording block regarded as a defect but not determined in the replacement of by ordinary user data recording. Address information of defect recording block records PBAm2 showing the absolute address of the recording block in the data recording area regarded to be defective, and no data is recorded in the replacement recording block address information (actually all filled with 0 or non-existing address).

The third example shows registration with type information identifier "0010" showing "OPC (Optimum Power Control)" as a result of an execution of test recording in the test recording area. Address information of defect recording block records PBAm3 showing the absolute address of the recording block in the test recording area to which test recording has been applied, and no data is recorded to the address information of replacement recording block.

The fourth example shows registration with type information identifier "0011" showing "OPC2" as a result of an execution of test recording using the spare area. Address information of a defect recording block records PBAm4 showing the absolute address of the recording block in the spare recording area to which test recording has been applied, and no data is recorded in the address information of replacement recording block.

The fifth example shows registration with type information identifier "0100" showing "DriveInformation" as a result of recording of drive control information using the spare area. Address information of defect recording block records no data, and PBAn5 showing the absolute address of the recording block in the spare area actually recording the drive control information is recorded in the address information of replacement recording block.

The sixth example shows registration with type information identifier "0101" showing "DataInformation" as a result of a replacement process of specific information included in a specific address in the inner area or outer area by using the spare area. Address information of a defect recording block records PBAm6 showing the specific address in which the specific information has been originally recorded, and address information of a replacement recording block records PBAn6 showing the absolute address of the replacement block of the specific information. Replacement of specific information (non-user data) included in a specific address in the inner area or outer area (that is, area other than data recording area) is specifically described below.

In the conventional defect management method of an optical disk medium and method of use of a defect management area, only the defect in the area for storing ordinary user data is managed, and nothing else has been done. But, in the method described below, a replacement process of non-user data recorded in an area other than a data area, which has not been done thus far, can be realized.

FIG. 9 is a flowchart showing an example of a replacement process of specific information recorded in a specific address in an inner area or an outer area.

When updating information recorded in an inner or outer specific address is started, whether the area including the specific address of the inner or outer area is usable or not (step S1201) is checked first. For example, if the disk medium is of write-once type, whether the area including the inner or outer specific address is usable or not is determined by checking whether unused recording block (unrecorded block) is present in the area including the inner or outer specific address. Whether write-once type or rewritable type, the recording and reproducing quality may be inspected (judging if the area is defective or not) by verifying the result of recording.

When the area including the specific address is judged to be usable, the information is updated and recorded in the area including the specific address (step S1202). If the area including the specific address is judge to be unusable, the information is updated and recorded in the data recording area (step S1203).

After updating and recording of the information in the area including the inner or outer specific address or in the data recording area, the address information showing the position of recording block of information updating is held as an address pointer (step S1204), and the information including the inner and outer specific address (that is, defect block address) and address pointer of block recording the updated information is updated as defect management information (step S1205), and then updating of information is terminated.

In this way, even if the area for storing non-user data cannot be used due to defect or depletion of an area, a replacement process is possible by using the data recording area, and by registering the replacement position. The replacement position of non-user data can be managed similarly to the ordinary user data defect management.

Examples of non-user data include, history (log) of information recording in the information recording apparatus, information for copyright protection of recorded contents, and information for management (file management) of user data.

As described herein, by making use of the defect management list, which is part of defect management information recorded in the defect management area, execution results of test recording or updating of drive information explained in the embodiment can be managed as history. At this time, depending on the type of process, by recording the defect recording block address information or replacement recording block address information, various processing results other than user data recording can be managed in a relatively easy manner, in the same sense as in conventional defect management process.

In registration examples in FIG. 8, the method of providing a type information identifier in the defect management list is shown as an example, but the type information identifier is not absolutely necessary for realizing the effects of the invention. Depending on the type of processing, the address information of a defect block, or a replacement block, or both may be registered. For example, the address information of the recording block to which test recording is applied may be recorded as that of the defect block, or the address information of the recording block in which the updated drive control information is recorded may be recorded as that of the replacement block, and so forth. Hence the history of a processing result can be recorded, resulting in a history of processing results.

By providing more type information identifiers, all information included in the defect management list may not be interpreted in the recording apparatus or reproducing apparatus and the processing may be more efficient. An example is a case of judging whether the test recording area is usable or not (whether unrecorded block is present or not).

When type information identifiers are available, the recorded defect management list is searched for an element provided with type information identifier "0011" of OPC2. But when type information identifiers are not available, it requires an extra process of searching all of the defect recording block address information included in the defect management list, or scanning all information tracks in the test recording area for searching an unrecorded block. In other example, to judge whether unrecorded block is present in the drive control information area, when type information identifiers are available, it is sufficient to search for identifier "0100" of "Drive Information", and it can be judged more efficiently.

Herein, without type information identifiers, an example of judging easily whether an unrecorded block is present or not in the test recording area or drive control information area is shown. Although not shown in the drawing, "test recording area full flag" showing whether the test recording area is fully recorded or not and "drive control information area full flag" showing whether the drive control information area is fully recorded or not may be provided in the defect management information recorded in the defect management area.

In another example, although not shown in the drawing, the address information of the area to which the last test recording is applied, and the address information of the final area in which the drive control information is updated may be included in the defect management information recorded in the defect management area. Thus, from this address information, the address information of the area finally recorded can be easily recognized, and the processing efficiency of the recording apparatus or reproducing apparatus may be enhanced.

As shown in the example in FIG. 4, when the order of use of test recording is determined in advance, without including the address information of the past several times of test recording in the list, only the address information finally used in test recording may be registered in the list. Thus, the number of entries in the defect management list is reduced, the efficiency of the defect management is enhanced, and the necessary areas for defect management can be reduced. This can be similarly applied to recording of drive control information or other specific information.

It should be noted that such management information mentioned herein may be recorded in another area than the defect management area. However, in the system capable of managing defects (combination of information recording medium and recording apparatus), by including the management information group in the defect management area as explained in the method above, the recording apparatus or reproducing apparatus can obtain necessary information in batch in various processes only by accessing the defect management area, which contributes to higher efficiency of processing.

In this embodiment, the optical disk medium 101 and two-layer recording disk 101a are both explained as write-once type, but it can be similarly applied to the rewritable type recording medium capable of overwriting information several times on the same track.

Figure 10:
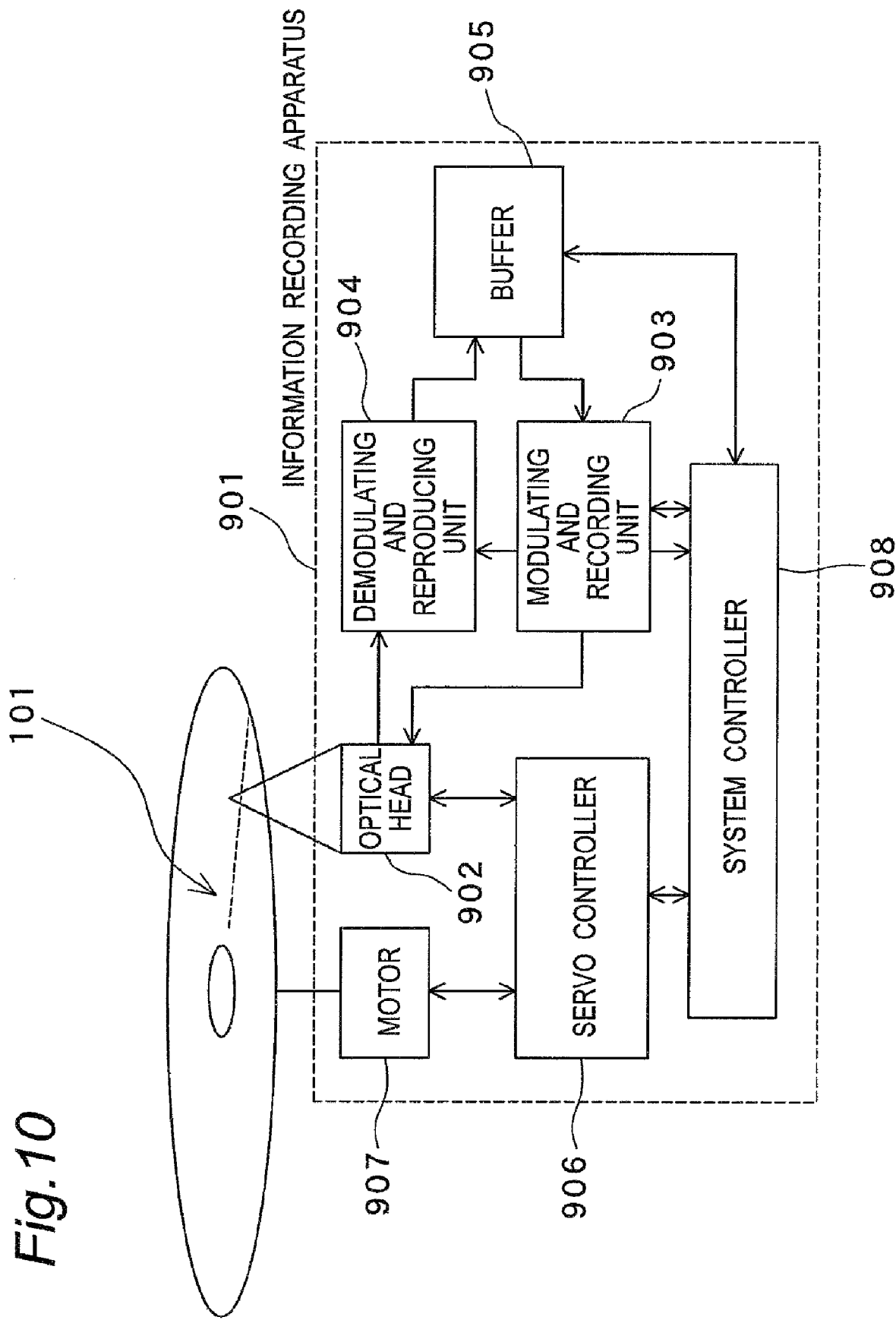
FIG. 10 is a block diagram showing an example of structure of an information recording apparatus in Embodiment 1 of the invention.

FIG. 10 is a block diagram showing an example of a structure of information recording apparatus 901 according to the invention. The information recording apparatus 901 includes the following elements 902 to 908.

An optical head 902 emits a laser spot to the recording layer of the optical disk medium 101, and detects reflected light from the recording layer of the optical disk medium 101. A modulating and recording unit 903 electrically drives a semiconductor laser (not shown) incorporated in the optical head 902, and modulates the laser light depending on the recorded data. A demodulating and reproducing unit 904 amplifies a reproduction signal electrically detecting the reflected light from the recording layer detected by a photo detector (not shown) incorporated in the optical head 902, separates and demodulates the signal component recorded in the optical disk medium 101, and reproduces necessary information. A buffer 905 temporarily holds the information to be recorded in the optical disk medium 101 and the information reproduced form the optical disk medium 101. A disk motor 907 rotates the optical disk medium 101. A servo controller 906 controls driving of the disk motor 907, moves the optical head 902 to a specified information track, and controls the tracking process of laser spot. A system controller 908 controls entirely the information recording apparatus 901.

Processing procedures mentioned above and described below (test recording, updating of drive control information, updating of defect management information) are realized by the system controller 908, while making use of various information content stored in the buffer 905, generating and adding new information if necessary, coordinating the modulating and recording unit 903, demodulating and reproducing unit 904, and servo controller 906, and thus recording and reproducing specified information through the optical head 902. The system controller 908 is composed of, for example, microprocessor, and executes a specified procedure by carrying out a specified program.

Embodiment 2

This embodiment refers to another example of determining the test recording area capable of absorbing the characteristic difference in the inner and outer circumference of the optical disk. In this embodiment, the test recording area is determined depending on the radial position of recording area of user data.

A method of determining the test recording area capable of absorbing the inner and outer characteristic difference in an optical disk having a single layer of information recording layer is explained first.

Figure 11:
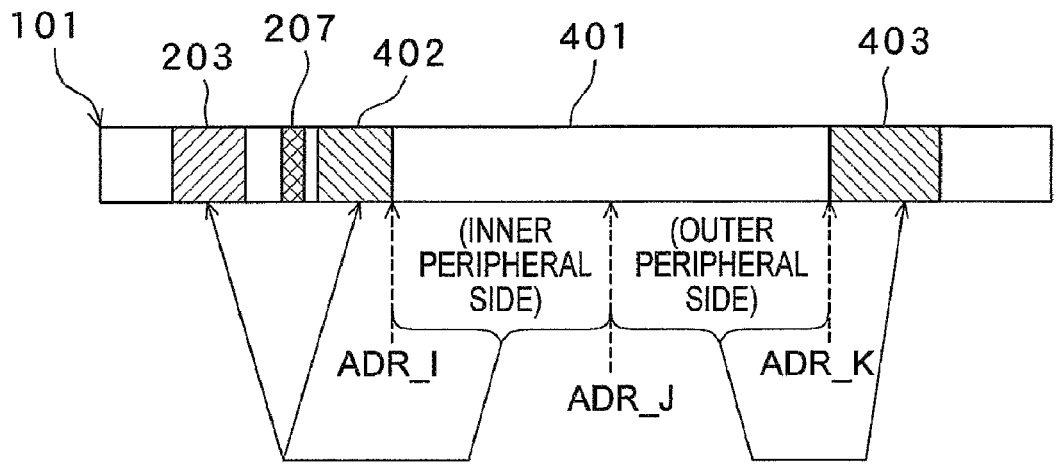
FIG. 11 is a diagram for explaining a method of determining the area for test recording in optical disk medium 101 in Embodiment 2 of the invention.

FIG. 11 is an explanatory diagram of a determining method of test recording area in the optical disk medium 101 in the embodiment. In FIG. 11, the area structure of the optical disk medium 101 is schematically shown from the innermost circumference (left side) to the outermost circumference (right side). The test recording area 203, the defect management area 207, the user data area 401, the first spare area 402, and the second spare area 403 having the same reference numerals in FIG. 2 and FIG. 4 are the same as mentioned above, and their explanation is omitted.

In this embodiment, depending on the radial position of recording user data in the user data area 401, whether to execute test recording is determined at the inner circumferential side or outer circumferential side.

The radial position of recording user data in the user data area 401 can be judged from the physical address uniquely given to the optical disk medium 101. In this embodiment, the physical address is given in ascending sequence from the innermost side to the outermost side, such as physical address ADR_I at the innermost track, and physical address ADR_K (ADR_I<ADR_K) at the outermost track in the user data area 401 as shown in FIG. 11.

When the information recording apparatus receives a recording command of data externally, the information recording apparatus is commanded to record the data in a specified logical address. From this specified logical address, the information recording apparatus determines the address (target physical address) ADR_X for recording data on the optical disk medium 101. If test recording is judged to be necessary in the information recording apparatus, test recording is made at the inner side if the target physical address ADR_X satisfies a relation of ADR_X<ADR_J. Or test recording is made at the outer side if the target physical address ADR_X satisfies a relation of ADR_X>ADR_J. Herein, ADR_J is a specified physical address, which satisfies the relation of ADR_I<ADR_J<ADR_K.

That is, the specified physical address ADR_J is a boundary for dividing the user data area 401 into the inner side and outer side. By comparing the target address ADR_X to be recorded with user data with the specified physical address ADR_J, a judgment is made whether to make test recording at the inner side or outer side.

It should be noted that the specified physical address ADR_J may be either uniquely defined or be set freely in the information recording apparatus.

The target physical address ADR_X is determined on the basis of the logical address specified by the recording command externally, but this is not limited. For example, it may be determined on the basis of the physical address of a final recording (most recently) executed by the information recording apparatus. In the case of a write-once type disk medium in which data is additionally recorded sequentially from the inner circumference to the outer circumference, the target physical address ADR_X may be determined on the basis of the final physical address in the already data recorded area.

In this embodiment, the inner side refers to the test recording area 203 or the first spare area 402, and the outer side shows the second spare area 403. It should be noted that the sequence of use in the test recording area 203 and the first spare area 402 at the inner side may be determined as mentioned above. That is, the areas are used sequentially from the innermost side, from the test recording area 203 to the first spare area 402. When the test recording area 203 is unusable, the first spare area 402 may be used, but it does not matter if the first spare area 402 is used while the test recording area 203 is not unusable yet. It also should be noted that the first spare area 402 may not be present at the inner side, or the second test recording area may be present at the outer side.

As explained herein, when recording user data in the user data area 401, the test recording area can be determined depending on its radial position, and this operation is realized by the specific structure and procedure mentioned above.

Therefore, since test recording can be made by selecting the area closest to the radial position in which the next user data will be recorded, the access speed is enhanced, and a drop of throughput of the information recording apparatus by execution of test recording can be avoided. Thus, even in the disk medium having a difference in the recording and reproducing characteristics between the inner circumference and the outer circumference, the recording and reproducing conditions can be optimized effectively on the basis of test recording, so that the reliability of the apparatus can be enhanced.

Next described is a method of determining the test recording area capable of absorbing the inner and outer characteristic difference in a two-layer recording disk.

Figure 12:
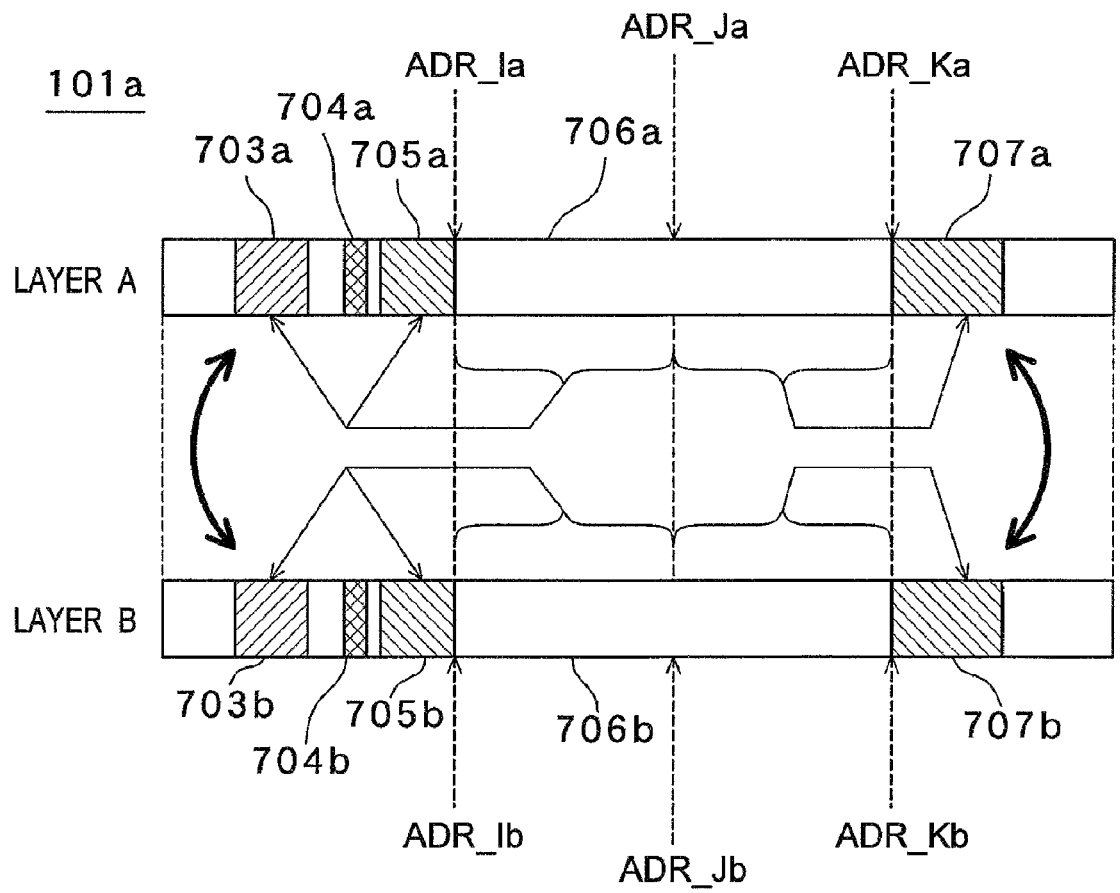
FIG. 12 is a diagram explaining a method of determining the test recording area in a two-layer recording disk.

FIG. 12 is an explanatory diagram of a determining method of test recording area for making a test recording in a two-layer recording disk. In FIG. 12, the area structure of recording layers (layer A, layer B) of the two-layer recording disk 101a is schematically shown from the inner most circumference (left side) to the outermost circumference (right side). The test recording areas 703a, 703b, defect management areas 704a, 704b, user data areas 706a, 706b, inner spare areas 705a, 705b, and outer spare areas 707a, 707b having the same reference numerals as in FIG. 7 are the same as mentioned above, and their explanation is omitted.

As shown in FIG. 12, a physical addresses of the innermost track in the user data areas 706a, 706b are respectively ADR_Ia, ADR_Ib, physical addresses of the outermost track are respectively ADR_Ka, ADR_Kb (note, ADR_Ia<ADR_Ka, ADR_Kb<ADR_Ib). In the layer A, which is a recording layer at the far side from the optical head 902 emitting light beam, physical addresses are assigned in ascending order from the innermost circumference to the outermost circumference, while in the layer B which is a recording layer closer to the optical head 902, physical addresses are assigned in ascending order from the outermost circumference to the innermost circumference. Therefore, the radial position of recording user data in the user data areas 706a, 706b can be judged from the physical address uniquely given to the optical disk 101a.

It is possible to determine whether the target physical address ADR_X providing a location at which user data is to be recorded is in the layer A or layer B by comparing the target physical address ADR_X with the innermost addresses ADR_Ia, ADR_Ib and the outermost addresses ADR_Ka, ADR_Kb in each layer. From this result, it can be determined whether the test recording is made in layer A or layer B.

Further, by defining the specified physical addresses in each layer ADR_Ja, ADR_Jb (note, ADR_Ia<ADR_Ja<ADR_Ka, ADR_Kb<ADR_Jb<ADR_Ib), and comparing the target physical address ADR_X for providing a location at which user data is to be recorded with the specified physical address, the target physical address ADR_X is determined whether at the inner side or at the outer side of the specified addresses ADR_Ja, ADR_Jb. From this result, depending on the target physical address ADR_X, the area for recording data can be determined in either layer A or layer B, but also for recording in either the inner side or outer side.

In this embodiment, as shown in FIG. 12, when the target physical address ADR_X satisfies the relation of ADR_X<ADR_Ja, the area to be recorded with data is judged to be at the inner side of layer A, and a test recording is executed in the test recording area 703a or the inner spare area 705a.

When the target physical address ADR_X satisfies the relation of ADR_Ja≦ADR_X≦ADR_Ka, the area to be recorded with data is judged to be at the outer side of layer A, and test recording is executed in the outer spare area 707a.

When the target physical address ADR_X satisfies the relation of ADR_Kb≦ADR_X<ADR_Jb, the area to be recorded with data is judged to be at the outer side of layer B, and a test recording is executed in the outer spare area 707b.

Similarly, when the target physical address ADR_X satisfies the relation of ADR_Jb≦ADR_X≦ADR_Ib, the test recording is executed in the test recording area 703b or the inner spare area 705b.

In this method, therefore, since test recording can be made in the same recording layer as the layer to be recorded with the next user data, the access speed can be enhanced and a drop of throughput of the information recording apparatus by execution of test recording can be avoided. Thus, even in the disk medium having difference in the recording and reproducing characteristics between the recording layers, and/or between the inner circumference and the outer circumference, the recording and reproducing conditions can be optimized effectively on the basis of test recording, so that the reliability of the apparatus can be enhanced.

The specified physical addresses ADR_Ja and ADR_Jb may be either determined in advance or be set freely in the information recording apparatus.

The target physical address ADR_X may be determined, as explained above, on the basis of the logical address specified by the recording command provided from outside, or it may be determined on the basis of the physical address in which the information recording apparatus finally (most recently) accessed for recording. Regarding a write-once type disk medium to which data is additionally recorded sequentially from the inner circumference to the outer circumference, the target physical address ADR_X may be determined on the basis of the final physical address in the area in which data has been already recorded.

In this embodiment, the user data area is divided into four areas, that is, the inner side of layer A, the outer side of layer A, the inner side of layer B, and the outer side of layer B. A test recording area is properly selected, but this is not limited. If at least one of the inner and outer characteristic difference and access time loss due to moving between inner and outer circumferences is a problem in particular, the layers A and B may be considered as one layer, and the areas may be divided into the inner side and outer side only.

In the foregoing explanation, a test recording is made in the spare area closer to the radial direction at which the data is to be recorded, on the same layer as the layer to which the data is to be recorded. However if the spare area to be used in test recording is unusable, another spare area may be used instead. For example, if the outer spare area 707a of the layer A is unusable, the inner spare area 705a of the same layer (layer A) may be used, or the outer spare area 707b of other layer (layer B) may be used. Similarly, if the inner spare area 705a of the layer A is unusable, the outer spare area 707a of the same layer (layer A) may be used, or the inner spare area 705b of other layer (layer B) may be used. In selecting the substitute area to be used, consideration should be given of at least one of the inner and outer characteristic difference between layers and access time loss between recording layers.

Embodiment 3

This embodiment shows an example of a test recording made in a write-once type optical disk medium (for example, DVD-R) applied with a "linking method" in which data is linked and recorded sequentially from the inner circumference to the outer circumference.

FIGS. 13 A to 13D show the write-once type optical disk medium applicable to a linking method, and the information recording procedure. As shown in the drawings, a guide groove is spirally formed in a write-once type optical disk medium 1301 from the inner circumference to the outer circumference, and this is called an "information track" 1302. In the information track 1302, physical addresses are preliminarily recorded according to a specified format by shape changes of the guide groove, and the information recording apparatus identifies the physical address by reading the shape change of the guide groove formed in the information track 1302, and specifies the location for recording information.

Figure 13A:
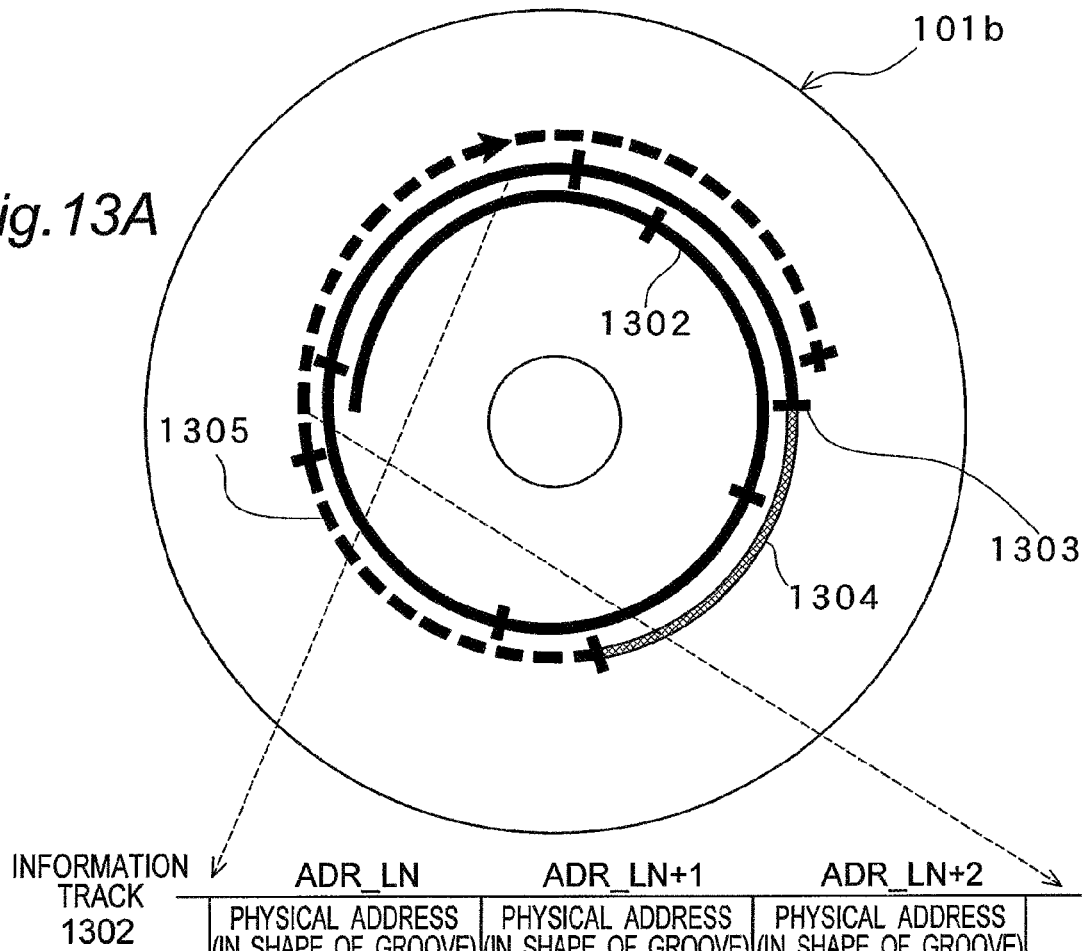
FIGS. 13A to 13D are diagrams explaining a write-once type optical disk medium using a linking method, and its information adding procedure.
Figure 13B:
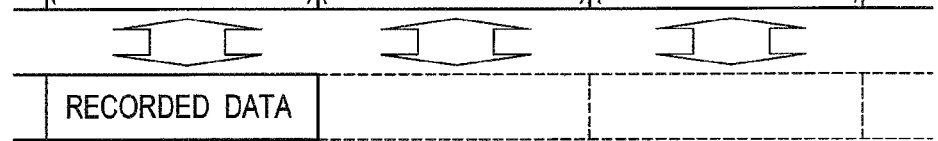

The procedure of recording data into the write-once type optical disk medium 1301 is explained according to FIGS. 13A to 13D. FIG. 13B shows a state of data already recorded up to a specified track position P indicated by physical address ADR_LN in a direction from the inner circumference to the outer circumference. The unit of physical address prerecorded in the information track 1302 by groove shape nearly coincides with the execution unit of data recording, and the physical addresses are assigned uniquely in ascending order from the inner circumference to the outer circumference.

Figure 13C:
Figure 13D:
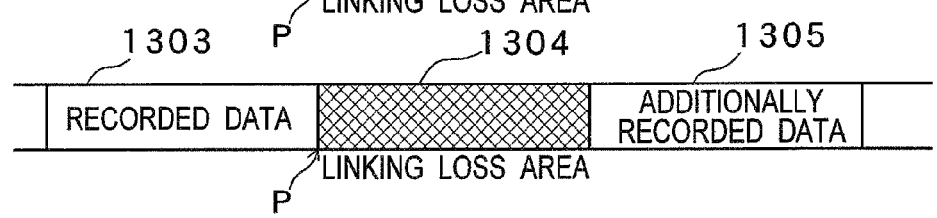

In this state, the procedure of additionally recording data is explained. When additionally recording data, first as shown in FIG. 13C, a linking loss area 1304 is made. The linking loss area 1304 corresponds to the information track indicating the physical address ADR_LN+1 consecutive to the tail of the recorded data. A specific data pattern, not including user data (for example, recording data of which all data value is 00h), is recorded in the linking loss area 1304. Successively as shown in FIG. 13D, additional data 1305 is recorded in the information track corresponding to the physical address ADR_LN+2 and after. It should be noted that FIGS. 13C and 13D are expressed differently, but recording in the linking loss area 1304 and recording of additional data 1305 are executed as a series of continuous actions.

The role of the linking loss area 1304 is explained below. The linking loss area 1304 is an area provided between areas in which additional data is recorded, and is provided in order to prevent an error from occurring at the beginning portion of the succeeding additional data 1305.

In the absence of linking loss area 1304, the tail of the recorded data 1303 and head of the additional data 1305 are directly coupled, but in the actual information recording apparatus, it is extremely difficult to link the two without deviation of a single bit due to phase deviation of a recording clock generating circuit or rotation jitter of disk, and generally a deviation of at least several bits occurs.

If the seam of the two is discontinuous, when reproducing the data straddling over the discontinuous point in the information reproducing apparatus, after passing the discontinuous point, the data cannot be reproduced correctly in the period from the out of synchronism of data until restoration. Recording data is generally in a format of continuously forming plural units called frames having synchronous pattern to synchronize the data. In such a case, the period from the out of synchronism of data until restoration is at least one frame, and depending on the deviation amount of discontinuous points, the data may not be reproduced correctly for a period of plural frames.

Generally, an error correction code is added to the recording data, and an error of data for a period of several frames can be corrected. But, if an error by another factor (such as disk defect) is included in the vicinity of data discontinuous points, it may exceed the correction ability, and the beginning of additional data may not be reproduced.

Accordingly, a section (linking loss area) is provided for recording dummy data in a specified period from the discontinuous point of linking, and the information reproducing apparatus makes use of this section and restores from the deviation of synchronism due to data discontinuity to avoid error in the succeeding additional data.

Figure 14:
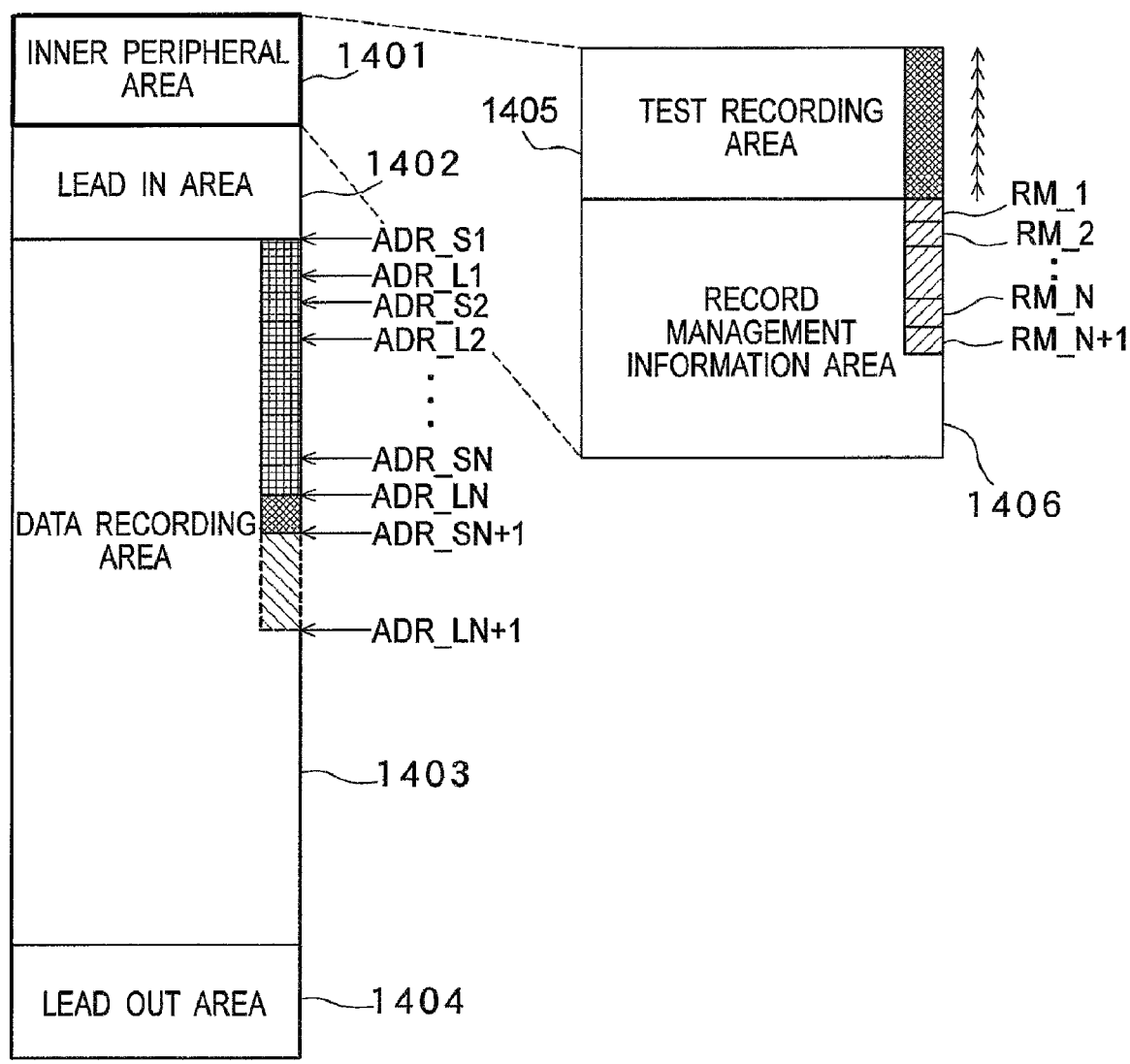
FIG. 14 is a diagram explaining an example of area structure of a write-once type optical disk medium shown in FIG. 13 and a management method of an additional recording of Embodiment 3.

FIG. 14 is a diagram for explaining an example of an area structure of the write-once type optical disk medium 101b explained in FIG. 13 and the management method of additional recording in the embodiment.

The write-once type optical disk medium 101b includes, from the inner circumference to the outer circumference, an inner area 1401, a lead-in area 1402, a data recording area 1403, and a lead-out area 1404. The inner area 1401 further includes a test recording area 1405 and a recording management information area 1406.

The lead-in area 1402 or lead-out area 1404 includes a read-only area in which information, called "control data", including the disk attribute and recording and reproducing conditions, is recorded before shipping of the disk.

The data recording area 1403 is an area for actually recording data including user data, and is used in the sequence of spiral direction of the track from the inner circumference as the feature of the write-once type.

The test recording area 1405 is an area prepared as an area for test recording for optimization of the recording and reproducing conditions in the information recording apparatus.

The recording management information area 1406 is an area for storing the management information as the history of additional recording when new information is added to the data recording area in the information recording apparatus.

The information adding process and recording process of management information are explained below.

First, when the first recording is made in an unrecorded state of the data recording area 1403, if optimization of a recording condition is necessary, a test recording is made in the test recording area 1405. After optimizing the recording condition, in the data recording area 1403, recording of data is executed from the beginning address ADR_S1 to the end address ADR_L1. The length up to the end address ADR_L1 is determined depending on the quantity of data to be recorded.

Depending on recording of data, recording management information RM_1 is recorded in the recording management information area 1406 at specified timing. The content of the recording management information RM_1 includes at least the start address ADR_S1 and end address ADR_L1 of data recording. In the recording management information area 1406, information about the location of linking loss area is recorded.

The information recording apparatus or information reproducing apparatus reads out the content of the recording management information area 1406 before recording or reproducing the data in the data recording area 1403, and hence, the recording history of the data can be understood efficiently, and the information retrieval performance can be enhanced.

In the recording management information RM_1, the history of test recording of the test recording area 1405 may be also stored. As a result, in the information recording apparatus, the situation of use (unrecorded position) of the test recording area 1405 can be known efficiently, which may lead to shortening of the time required for optimization of recording and reproducing conditions using the test recording area 1405.

When adding information in the already data recorded state, if optimization of the recording condition is similarly required, the test recording is made into the test recording area 1405. After optimization of the recording condition, in the data recording area 1403, the second data recording is executed from the start address ADR_S2 to the end address ADR_L2. It must be noted herein that the linking loss area is created prior to this second data recording. From the position corresponding to the next address to the end address ADR_L1 of the first recording till the position immediately before the start address ADR_S2 of the second data recording, a linking loss area is provided, in which dummy data (data of all 00h or the like) is recorded.

Depending on the second data recording, recording management information RM_2 is recorded with specified timing. The content of the recording management information RM_2 includes at least the start address ADR_S2 and end address ADR_L2 which are the latest data recording history. The recording management information RM_2 may include all past data recording history.

After recording data N times in this manner, the data recording area 1403 is filled with recording from the first data recording start address ADR_S1 to the N-th data recording end address ADR_LN, and the latest recording management information RM_N is recorded in the recording management information area 1406.

Here, presume all of the test recording area 1405 is used up after recording data N times.

In such a state, when adding further data, in the conventional method, if optimization of a recording condition is necessary, it could not be executed. Accordingly, although there is still a vacancy for the recording capacity of one disk, further data cannot be added, or data is added without optimizing the recording conditions, and thus the reliability of data may be lowered.

Figures 15A, 15B, 15C:
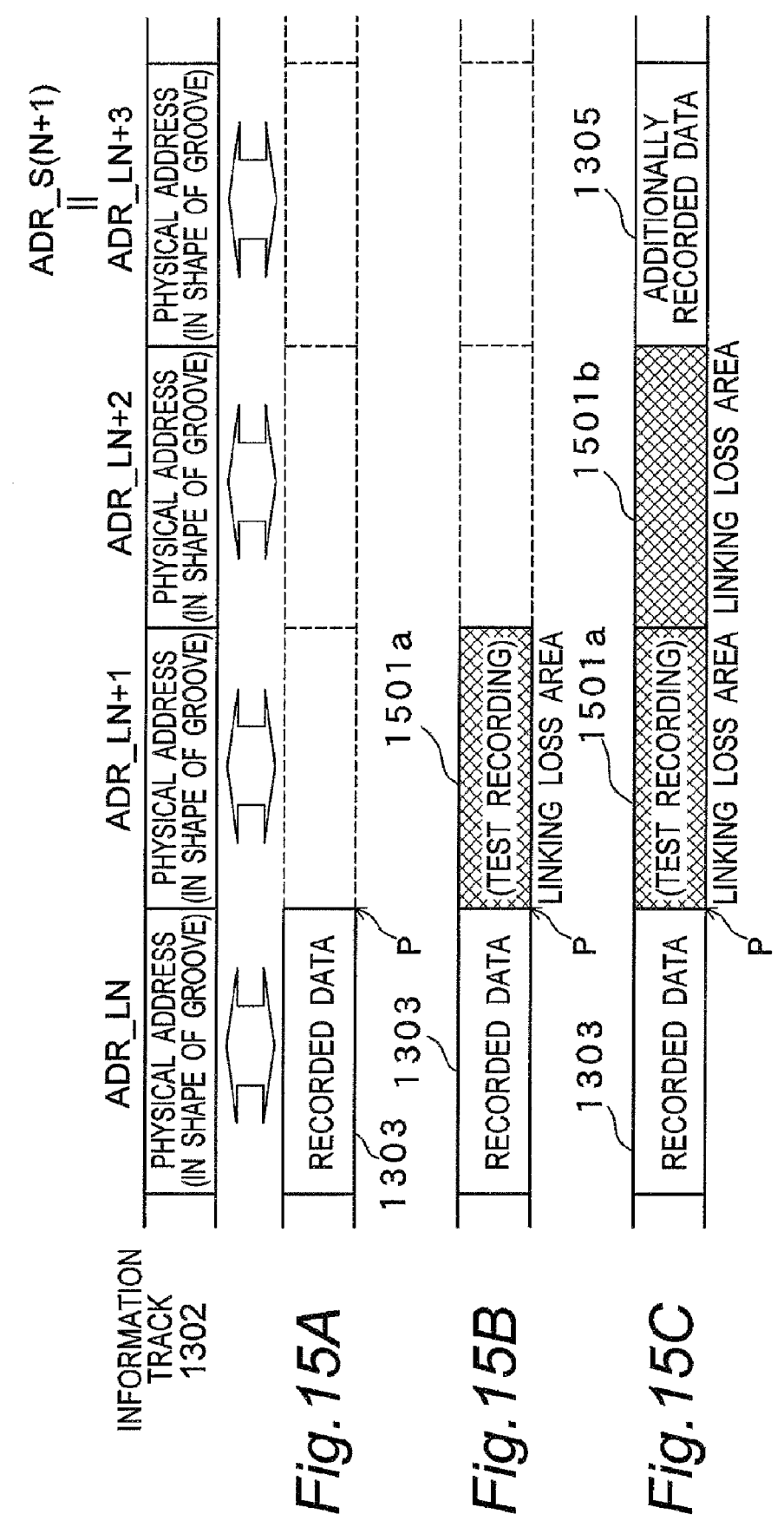

In this embodiment, to avoid such inconvenience, the linking loss area is utilized for optimizing the recording condition. Referring now to FIGS. 15A to 15C, an example of a procedure of adding data while optimizing the recording condition by using the linking loss area in the embodiment is explained.

FIG. 15A shows the tail of recorded data in the data recording area 1403 after recording data N times, in which data is recorded up to the data recording end address ADR_LN, but not recorded in next address ADR_LN+1 and after.

Prior to data recording of (N+1) times, the recording condition must be optimized, and if usable recording area is not left over in the test recording area 1405, as shown in FIG. 15B, a test recording is made in the area of address ADR_LN+1 following the final address ADR_LN obtained after completion of N times of data recording. The area to which this test recording is applied is a linking loss area 1501a.

After optimizing the recording condition in the linking loss area 1501a, as shown in FIG. 15C, a linking loss area 1501b is created in address ADR_LN+2 following the linking loss area 1501a, and additional data is recorded from the next address ADR_LN+3. In the linking loss area 1501b, a specified pattern (data of all 000h or the like) is recorded. Recording of linking loss area 1501b and recording succeeding additional data is executed in a series of continuous actions.

The test recording and recording procedure of additional data in this embodiment are described specifically herein. By making a test recording in the linking loss area 1501a consecutive to the tail of the recorded data, even if the test recording area 1405 is unusable, the recording condition can be optimized, and it does not need to provide a new test recording area. Even if the test recording area 1405 is unusable, therefore, there is no inconvenience such as failure of a further addition of data or lowering of recording reliability of additional data due to an improper recording condition.

In succession to the linking loss area 1501a used for test recording, the next linking loss area 1501b is created, and recording of additional data is started in a series of operation. Thus, when reproducing the beginning of additional data by the information reproducing apparatus, reproduction synchronism deviation can be corrected by using the linking loss area 1501b, and occurrence of an error at the beginning of additional data can be avoided.

That is, by the linking loss area 1501a and linking loss area 1501b, two functions of test recording and prevention of additional data beginning error are realized, and without requiring a new area, the reliability of data recording and reproduction can be assured.

Thus, as a result of data recording of (N+1) times, in the data recording area 1403, subsequent to linking loss areas 1501a, 1501b, as shown in FIG. 14, the area from data recording start address ADR_SN+1 to data recording end address ADR_LN+1q are recorded, and new recording management information RM-N+1 is recorded in the recording management information area 1406.

The content of the recording management information RM_N+1 includes at least the latest data recording history, that is, start address ADR_SN+1 and end address ADR_LN+1. The recording management information RM_N+1 may also include all of the past data recording history.

Even in the case of test recording in the linking loss area, special information may not be added to the content of the recording management information area 1406, but the history of addresses executing test recording may be stored. Thus, the information recording apparatus can recognize the situation of use (whether a vacant area is left over or not) of the test recording area 1405 efficiently only by reading the information in the recording management area 1406, and therefore the time required for optimization of the recording and reproducing condition can be shortened.

Although the present invention has been described in connection with specified embodiments thereof, many other modifications, corrections and applications are apparent to those skilled in the art. Therefore, the present invention is not limited by the disclosure provided herein but limited only to the scope of the appended claims.

INDUSTRIAL APPLICABILITY

The invention can update the specific information recorded in areas other than user data area (non-user data area) to the latest state regardless of a vacant state of the non-user data area, and can securely assure the reliability of information recording, and hence it is useful for large-capacity optical disk medium of rewritable type or write-once type and video disk recorder.

The invention claimed is:
1. An information recording medium comprising:
a plurality of recording layers, said plurality comprising a first recording layer and a second recording layer,
said first recording layer being farthest, among the plurality of recording layers, from a laser light source, said first recording layer including a data recording area for storing user data; and
the second recording layer being nearest, among the plurality of recording layers, to the laser light source, said second recording layer including a control information recording area for storing control information other than the user data, and
the data recording area including an area which is accessed for recording the control information therein in a case in which the control information recording area is unusable in recording the control information.
2. An apparatus for recording information on an information recording medium,
the information recording medium comprising a plurality of recording layers, said plurality comprising a first recording layer and a second recording layer, the first recording layer being farthest, among the plurality of recording layers, from a laser light source, the first recording layer including a data recording area for storing user data; and the second recording layer being nearest, among the plurality of recording layers, to the laser light source, the second recording layer including a control information recording area for storing control information other than the user data, and the data recording area including an area which is accessed for recording the control information therein in a case in which the control information recording area is unusable in recording the control information, the apparatus comprising:

a recording unit for recording information to the information recording medium, and in recording the control information, the recording unit records the control information in the data recording area if the control information recording area is unusable.

3. A method of reproducing the information recording medium according to claim 1, comprising:

reproducing the control information from the control information recording area or the area which is accessed for recording the control information.

4. The information recording medium according to claim 1, wherein the case that the control information recording area is unusable is a case that insufficient space is left in the control information recording area.

5. The apparatus according to claim 2, wherein the case that the control information recording area is unusable is a case that insufficient space is left in the control information recording area.

6. The information recording medium according to claim 3, wherein the case that the control information recording area is unusable is a case that insufficient space is left in the control information recording area.

* * * * *